United States Patent
Kachare et al.

(10) Patent No.: US 12,541,326 B2
(45) Date of Patent: Feb. 3, 2026

(54) DEVICE CACHE ENGINE FOR A CACHE-COHERENT INTERCONNECT MEMORY EXPANSION

(71) Applicant: Samsung Electronics Co., Ltd., Suwon-si (KR)

(72) Inventors: Ramdas P. Kachare, Pleasanton, CA (US); Jimmy Lau, Santa Clara, CA (US); Mohammadreza Soltaniyeh, Sunnyvale, CA (US); Amir Beygi, San Jose, CA (US); Tinh Lac, Manteca, CA (US); Divya Subbanna, San Jose, CA (US); Mostafa Aghaee, San Jose, CA (US); Dongwan Zhao, San Jose, CA (US); William Tien, San Jose, CA (US); Varadraj Ninad Sinai Kakodkar, San Jose, CA (US); Luis Vitorio Cargnini, San Jose, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 5 days.

(21) Appl. No.: 18/515,218

(22) Filed: Nov. 20, 2023

(65) Prior Publication Data
US 2024/0311049 A1    Sep. 19, 2024

Related U.S. Application Data

(60) Provisional application No. 63/452,691, filed on Mar. 16, 2023.

(51) Int. Cl.
G06F 3/06 (2006.01)

(52) U.S. Cl.
CPC .......... *G06F 3/0659* (2013.01); *G06F 3/0611* (2013.01); *G06F 3/0673* (2013.01)

(58) Field of Classification Search
CPC ..... G06F 3/0673; G06F 3/0611; G06F 3/0659
See application file for complete search history.

(56) References Cited

U.S. PATENT DOCUMENTS

| | | |
|---|---|---|
| 8,880,777 B2 | 11/2014 | Kim et al. |
| 8,935,493 B1 | 1/2015 | Dolan et al. |
| 9,135,173 B2 | 9/2015 | Benhase et al. |

(Continued)

FOREIGN PATENT DOCUMENTS

| | | |
|---|---|---|
| CN | 106843772 A | 6/2017 |
| EP | 4154121 A1 | 3/2023 |

(Continued)

OTHER PUBLICATIONS

European Extended Search Report for Application No. 24160253.1, mailed Jul. 22, 2024.

(Continued)

*Primary Examiner* — Jane W Benner
(74) *Attorney, Agent, or Firm* — Renaissance IP Law Group LLP

(57) ABSTRACT

A memory device is disclosed. The memory device may include an interface to connect the memory device to a processor, a first storage for a data, and a second storage for the data. A controller may process a request received from the processor via the interface using the first storage or the second storage. A policy engine may instruct the controller regarding a storing of the data in the first storage or the second storage.

20 Claims, 15 Drawing Sheets

(56) References Cited

U.S. PATENT DOCUMENTS

| | | | |
|---|---|---|---|
| 9,311,230 B2 | 4/2016 | Fitch et al. | |
| 9,459,809 B1 | 10/2016 | Chen et al. | |
| 10,176,212 B1 | 1/2019 | Prohofsky | |
| 10,635,598 B2 | 4/2020 | Veal et al. | |
| 10,678,760 B2 | 6/2020 | Marwah et al. | |
| 10,769,098 B2 | 9/2020 | Joshua et al. | |
| 10,929,291 B2 | 2/2021 | Jung et al. | |
| 10,929,309 B2 | 2/2021 | Benisty et al. | |
| 11,079,951 B2 | 8/2021 | Patel et al. | |
| 11,200,005 B2 | 12/2021 | Patel et al. | |
| 11,334,274 B2 | 5/2022 | Kabra et al. | |
| 11,347,699 B2 | 5/2022 | Carpenter et al. | |
| 11,392,499 B2 | 7/2022 | Das et al. | |
| 11,561,909 B2 | 1/2023 | Hahn et al. | |
| 11,599,472 B1 | 3/2023 | Isenegger et al. | |
| 11,669,260 B2 | 6/2023 | Mittal et al. | |
| 12,056,066 B2 | 8/2024 | Lee et al. | |
| 2006/0248124 A1* | 11/2006 | Petev | G06F 12/0842 711/E12.039 |
| 2015/0006787 A1 | 1/2015 | Liu et al. | |
| 2019/0034353 A1* | 1/2019 | Liem | G06F 12/12 |
| 2019/0166172 A1 | 5/2019 | Kurian et al. | |
| 2019/0272240 A1 | 9/2019 | Kachare et al. | |
| 2019/0272242 A1 | 9/2019 | Kachare et al. | |
| 2020/0019336 A1 | 1/2020 | Kachare et al. | |
| 2020/0104275 A1 | 4/2020 | Sen et al. | |
| 2020/0117397 A1 | 4/2020 | Li et al. | |
| 2020/0183582 A1 | 6/2020 | Kachare et al. | |
| 2020/0379926 A1* | 12/2020 | Gopalakrishnan | G06F 13/1668 |
| 2021/0117427 A1* | 4/2021 | Xiang | G06F 16/24532 |
| 2021/0390053 A1 | 12/2021 | Roberts | |
| 2022/0004668 A1 | 1/2022 | Dewan et al. | |
| 2022/0350747 A1 | 11/2022 | Hahn et al. | |
| 2022/0358041 A1 | 11/2022 | Vijayrao et al. | |
| 2023/0052700 A1 | 2/2023 | Clark et al. | |
| 2023/0062610 A1 | 3/2023 | Gim et al. | |
| 2023/0205449 A1 | 6/2023 | Jeong et al. | |
| 2023/0236742 A1 | 7/2023 | Sehgal et al. | |

FOREIGN PATENT DOCUMENTS

| | | |
|---|---|---|
| WO | 2021236800 A1 | 11/2021 |
| WO | 2023022776 A1 | 2/2023 |

OTHER PUBLICATIONS

Jung, Myoungsoo, "Hello Bytes, Bye Blocks: PCIe Storage Meets Compute Express Link for Memory Expansion (CXL-SSD)," Proceedings of the 14th ACM Workshop on Hot Topics in Storage and File Systems, Jun. 2022, pp. 45-51.
European Extended Search Report for Application No. 24212094.7, mailed Mar. 26, 2025.
European Office Action for Application No. 24160253.1, mailed Mar. 10, 2025.
Office Action for U.S. Appl. No. 18/513,496, mailed Jan. 30, 2025.
European Office Action for Application No. 24212094.7, mailed Aug. 20, 2025.
Final Office Action for U.S. Appl. No. 18/513,496, mailed Jul. 7, 2025.
Notice of Allowance for U.S. Appl. No. 18/513,496, mailed Dec. 9, 2025.

* cited by examiner

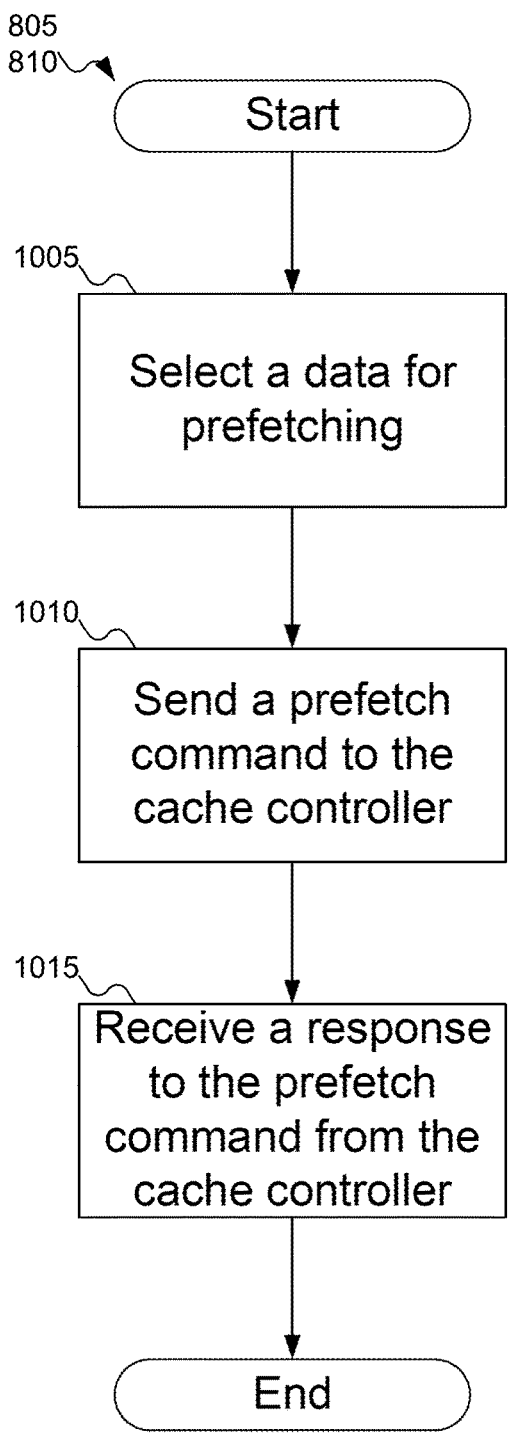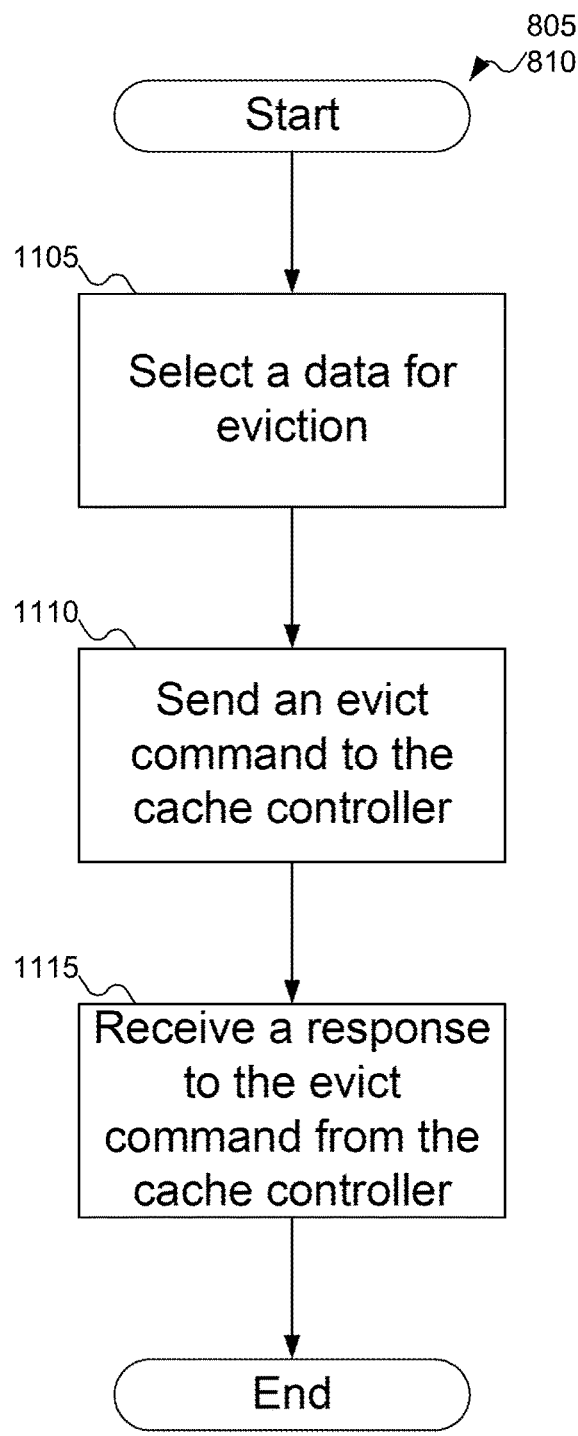
FIG. 10
FIG. 11

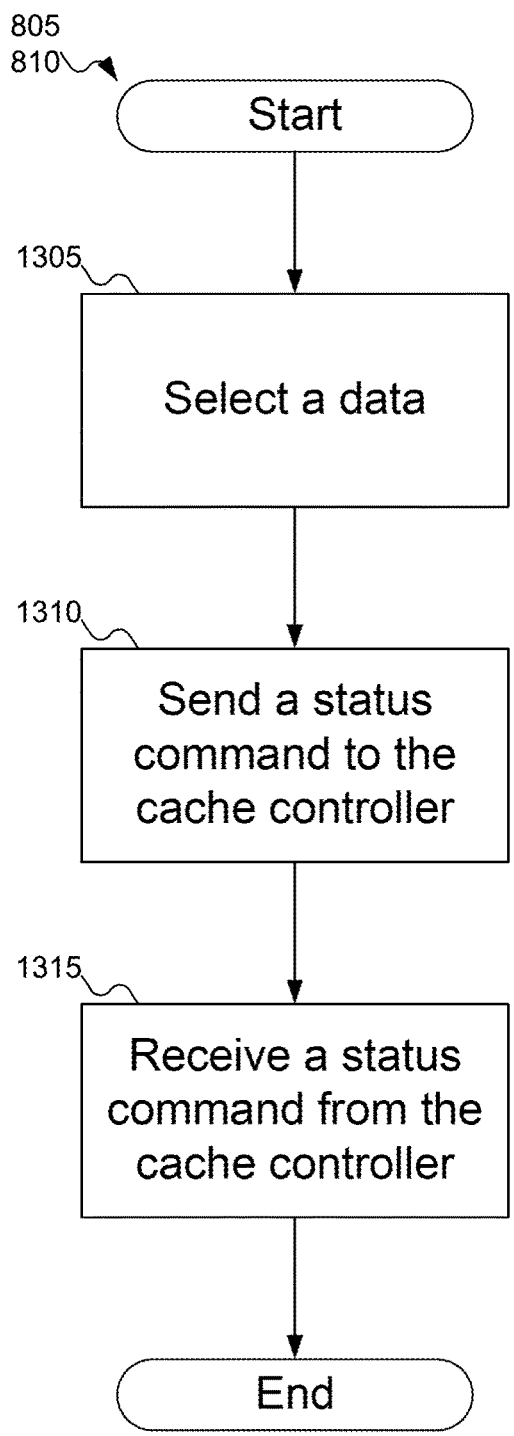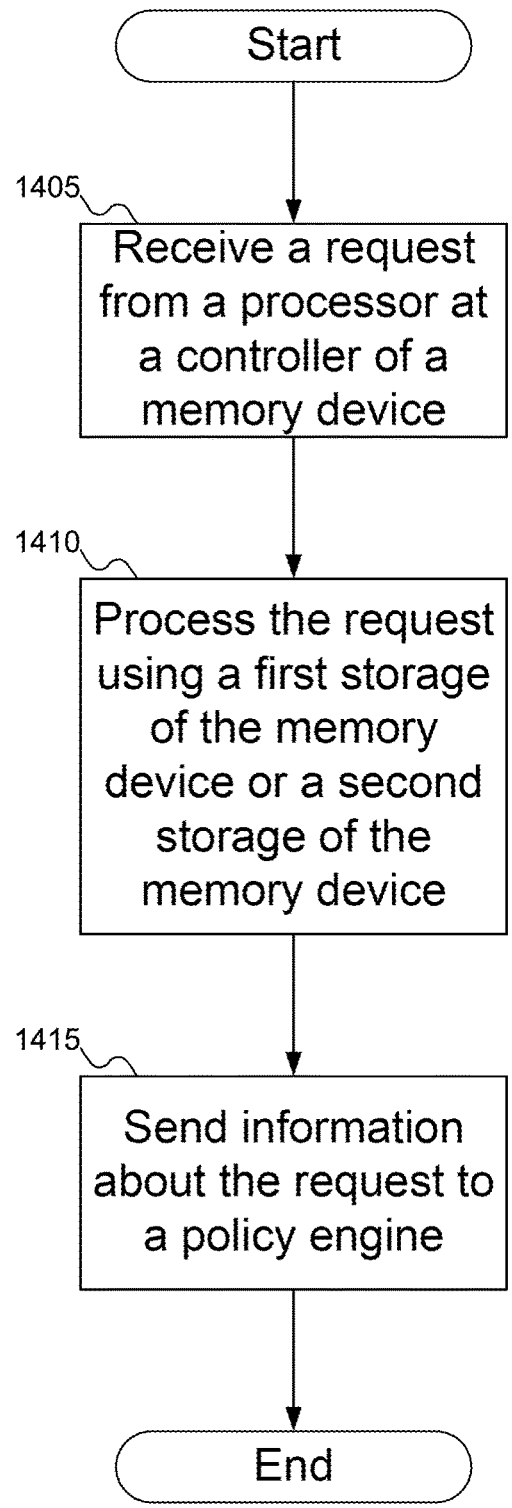
FIG. 13
FIG. 14

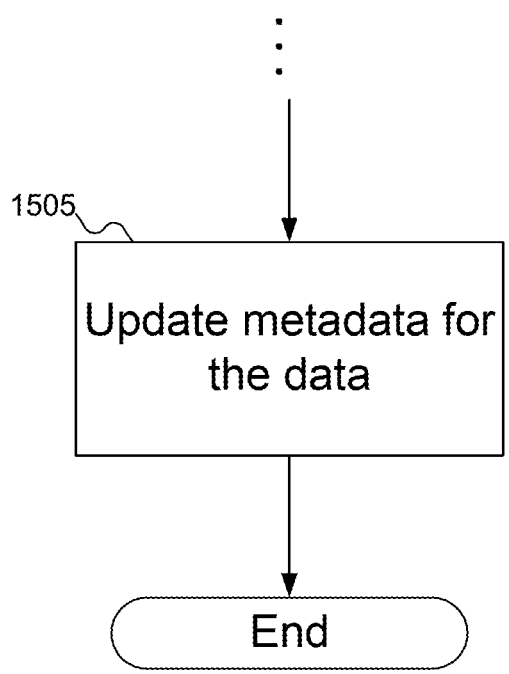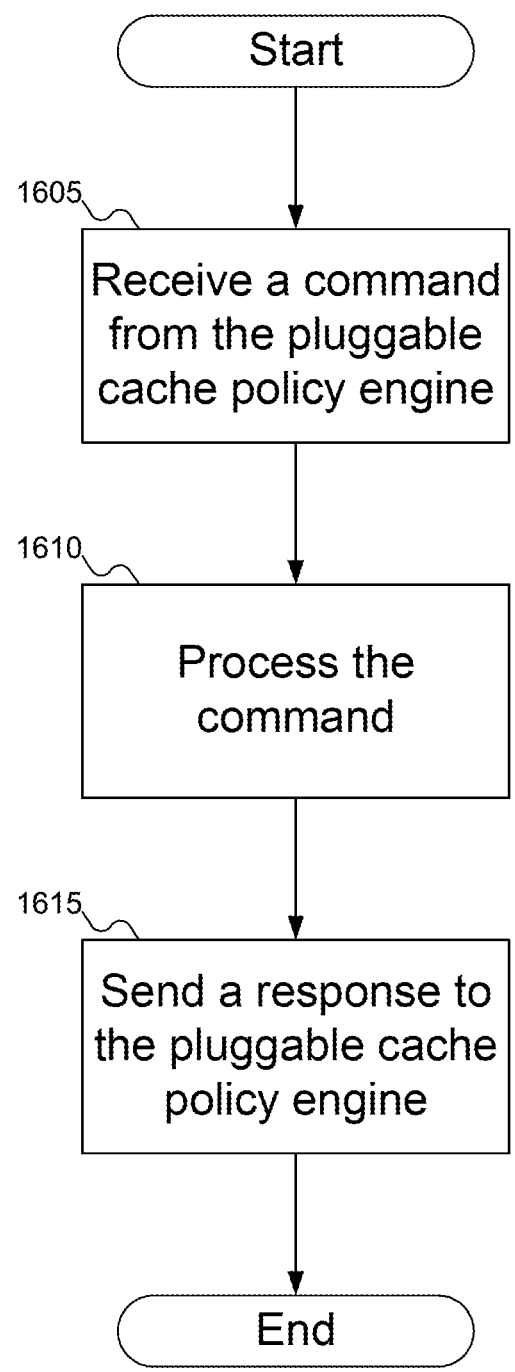
FIG. 15
FIG. 16

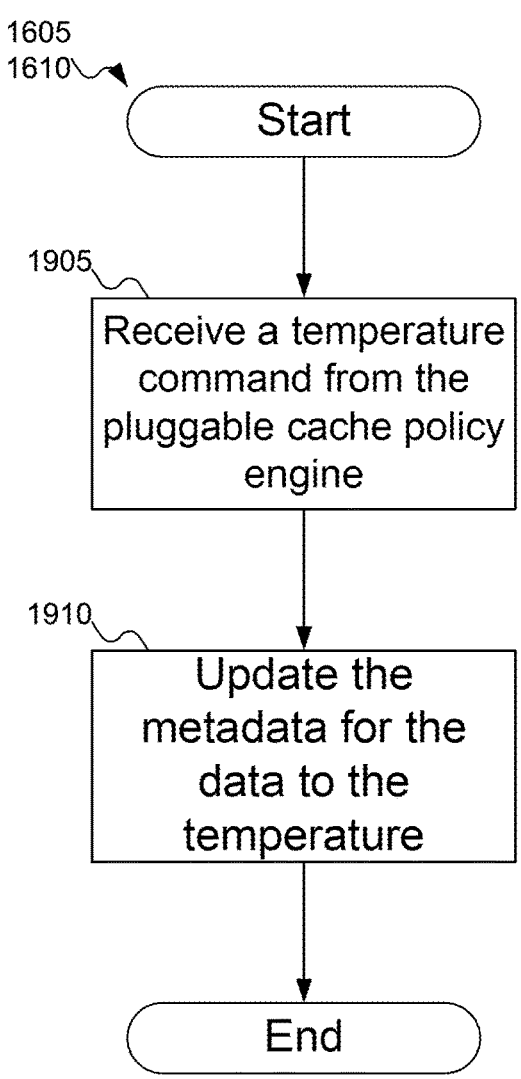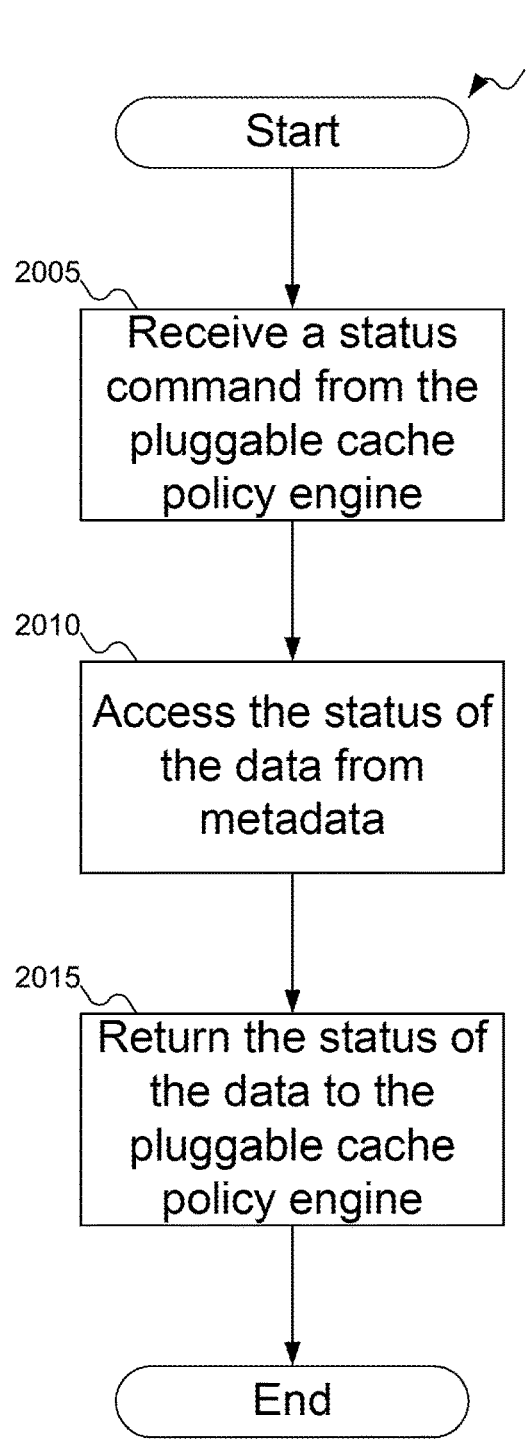
FIG. 19
FIG. 20

DEVICE CACHE ENGINE FOR A CACHE-COHERENT INTERCONNECT MEMORY EXPANSION

RELATED APPLICATION DATA

This application claims the benefit of U.S. Provisional Patent Application Ser. No. 63/452,691, filed Mar. 16, 2023, which is incorporated by reference herein for all purposes.

FIELD

The disclosure relates generally to memory and storage, and more particularly to improving latency for input/output requests.

BACKGROUND

Many applications, such as artificial intelligence models, rely on databases that are large. Each individual access might not take a relatively long time. But when multiplied by the number of individual accesses that might be made to process some data, the latency for each individual access may become significant.

Storing the entire database in fast storage (such as Dynamic Random Access Memory (DRAM)) may ensure rapid access to the data. But the relative cost of DRAM to other forms of storage may make the cost of using DRAM to store the data prohibitive.

A need remains to support faster data access.

BRIEF DESCRIPTION OF THE DRAWINGS

The drawings described below are examples of how embodiments of the disclosure may be implemented, and are not intended to limit embodiments of the disclosure. Individual embodiments of the disclosure may include elements not shown in particular figures and/or may omit elements shown in particular figures. The drawings are intended to provide illustration and may not be to scale.

FIG. 10 shows a flowchart of an example procedure for the pluggable cache policy engine of FIG. 3 to send a prefetch command to the cache controller of FIG. 3, according to embodiments of the disclosure.

FIG. 11 shows a flowchart of an example procedure for the pluggable cache policy engine of FIG. 3 to send an evict command to the cache controller of FIG. 3, according to embodiments of the disclosure.

FIG. 13 shows a flowchart of an example procedure for the pluggable cache policy engine of FIG. 3 to send a status command to the cache controller of FIG. 3, according to embodiments of the disclosure.

FIG. 14 shows a flowchart of an example procedure for the cache controller of FIG. 3 to inform the pluggable cache policy engine of FIG. 3 about requests from the host of FIG. 1, according to embodiments of the disclosure.

FIG. 15 shows a flowchart of an example procedure for the cache controller of FIG. 3 to update the metadata of FIG. 5, according to embodiments of the disclosure.

FIG. 16 shows a flowchart of an example procedure for the cache controller of FIG. 3 to receive commands from the pluggable cache policy engine of FIG. 3, according to embodiments of the disclosure.

FIG. 19 shows a flowchart of an example procedure for the cache controller of FIG. 3 to process a temperature command received from the pluggable cache policy engine of FIG. 3, according to embodiments of the disclosure.

FIG. 20 shows a flowchart of an example procedure for the cache controller of FIG. 3 to process a status command received from the pluggable cache policy engine of FIG. 3, according to embodiments of the disclosure.

SUMMARY

Figure 1:
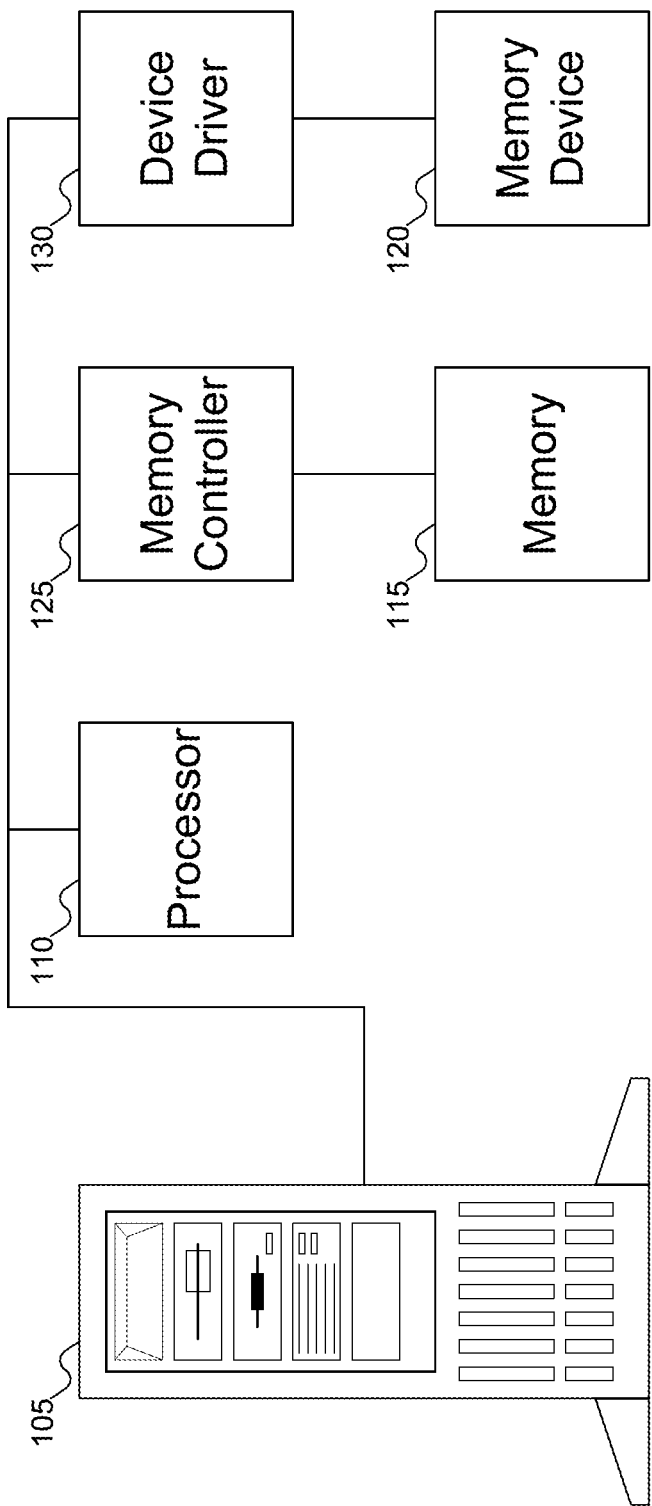
FIG. 1 shows a machine including a memory device to store data, according to embodiments of the disclosure.

A memory device may include a first storage and a second storage. A controller may process requests received from the processor using data in the first storage or the second storage. A policy engine may instruct the controller regarding storing data in the first storage or the second storage.

DETAILED DESCRIPTION

Reference will now be made in detail to embodiments of the disclosure, examples of which are illustrated in the accompanying drawings. In the following detailed description, numerous specific details are set forth to enable a thorough understanding of the disclosure. It should be understood, however, that persons having ordinary skill in the art may practice the disclosure without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the disclosure.

The terminology used in the description of the disclosure herein is for the purpose of describing particular embodiments only and is not intended to be limiting of the disclosure. As used in the description of the disclosure and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Many applications, such as artificial intelligence models or machine learning models, may process relatively large amounts of data. Executing a particular command may involve accessing large amounts of data. While the latency associated with an individual data access might not be a significant factor when only one data element is accessed from the database, even a small difference latency may become a significant factor when thousands or millions (or more) of data elements are used by the application to execute a particular command. For example, the average latency of Dynamic Random Access Memory (DRAM) is between 10-20 nanoseconds (ns), whereas the average latency of a Solid State Drive is 40-60 microseconds (µs). DRAM is therefore 2000 times faster than an SSD (or more).

Installations could therefore achieve fast data access by installing large amounts of DRAM to store all the data (and use a non-volatile storage, such as an SSD—i.e., NAND flash media—or a Hard Disk Drive (HDD)—i.e., magnetic media), as a backup again data loss due to power interruptions or other factors). But DRAM is also more expensive than an SSD: the average price for 1 gigabyte (GB) of SSD is approximately $0.06, whereas the average price for 1 GB of DRAM is approximately $0.43, making DRAM approximately seven times more expensive than an SSD. And since DRAM is volatile storage, non-volatile storage may also be needed to protect against data loss, further increasing the price per GB of data to be stored.

As a result, installations attempt to balance these factors (speed of data access vs. cost) by compromising somewhere in the middle. Cache-coherent storage devices are one way in which installations may balance these factors. A cache-coherent storage device may include an SSD and/or an HDD as non-volatile storage along with some amount of DRAM for fast access. Data may be copied from the SSD and/or an HDD into the DRAM when accessed to expedite subsequent accesses to the data, and changes may be written back to from the DRAM into the SSD and/or an HDD to ensure changes are stored in persistent storage. In addition, because a cache-coherent storage device may be treated as an extension of system memory, applications (and operating systems) may avoid concerns with where any particular data is stored: the cache-coherent storage device may manage transfers of data between the SSD and/or an HDD and the DRAM automatically and transparently. All the application may see is a large quantity of system memory that may be accessed as needed.

But the first access of data not currently in the DRAM of a cache-coherent storage device may still be relatively slow, since the data is accessed from the SSD and/or an HDD. In addition, given that the amount of DRAM in a cache-coherent storage device is relatively small relative to the advertised space (with data being moved between the DRAM and the SSD and/or an HDD as needed to look as though the entire advertised storage space is available), if data is evicted from the DRAM to make room for new data, a later access to the evicted data may again be relatively slow, with the data again to be moved from the SSD and/or an HDD to the DRAM.

The cache-coherent storage device may use various policies to decide what data to evict from the DRAM, and also what data to prefetch from the SSD and/or an HDD into the DRAM (in attempt to make the first access to the data faster). But there is no one-size-fits-all approach to such policies. An eviction policy or a prefetch policy might work well for one application, but work poorly for another application.

Embodiments of the disclosure may include pluggable policies in a cache-coherent storage device. In this manner, an application developer may also design policies to be used for evicting data from the DRAM or for prefetching data from the SSD that are designed specifically for the applications using the data stored on the cache-coherent storage device. The application developer may therefore be able to achieve lower overall latency from a cache-coherent storage device for their application by leveraging knowledge about the data access patterns of the application.

FIG. 1 shows a machine including a memory device to store data, according to embodiments of the disclosure. In FIG. 1, machine 105, which may also be termed a host or a system, may include processor 110, memory 115, and memory device 120. Processor 110 may be any variety of processor. Processor 110 may also be called a host processor. (Processor 110, along with the other components discussed below, are shown outside the machine for ease of illustration: embodiments of the disclosure may include these components within the machine.) While FIG. 1 shows a single processor 110, machine 105 may include any number of processors, each of which may be single core or multi-core processors, each of which may implement a Reduced Instruction Set Computer (RISC) architecture or a Complex Instruction Set Computer (CISC) architecture (among other possibilities), and may be mixed in any desired combination.

Processor 110 may be coupled to memory 115. Memory 115 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM), flash memory, etc. Memory 115 may be a volatile or non-volatile memory, as desired. Memory 115 may also be any desired combination of different memory types, and may be managed by memory controller 125. Memory 115 may be used to store data that may be termed "short-term": that is, data not expected to be stored for extended periods of time. Examples of short-term data may include temporary files, data being used locally by applications (which may have been copied from other storage locations), and the like.

Processor 110 and memory 115 may also support an operating system under which various applications may be running. These applications may issue requests (which may also be termed commands) to read data from or write data to either memory 115.

Memory device 120 may be used to extend memory 115. That is, memory 115 may consist of one form of memory, whereas memory device 120 may include another form of memory. Processor 110 may see memory 115 and memory device 120 as one large region of memory. For example, memory device 120 may use a cache-coherent interconnect protocol, such as Compute Express Link™ (CXL™) protocols. (Compute Express Link and CXL are trademarks of the CXL Consortium in the United States.) CXL protocols may include various protocols that may be used to access data from memory device 120 as though memory device 120 was part of memory 115. Memory device 120 may use a persistent storage, such as a storage device, to store data that may be termed "long-term": that is, data that is expected to be stored for longer periods of time, or that does not need to be stored in memory 115. Memory device 120 may be accessed using device driver 130. While FIG. 1 shows one memory device 120, there may be any number (one or more) of memory devices in machine 105. Memory device 120 is discussed further with reference to FIG. 3 below.

Machine 105 may also include one or more storage devices (not shown in FIG. 1). A storage device 120 may also be used to store data that may be termed "long-term": that is, data that is expected to be stored for longer periods of time, or that does not need to be stored in memory 115. Storage device 120 may also be accessed using device driver 130 (or using another device driver).

Embodiments of the disclosure may include any desired mechanism to communicate with memory device 120. For example, memory device 120 may connect to one or more busses, such as a Peripheral Component Interconnect Express (PCIe) bus, or memory device 120 may include Ethernet interfaces or some other network interface. Other potential interfaces and/or protocols to memory device 120 may include Non-Volatile Memory Express (NVMe), NVMe over Fabrics (NVMe-oF), Remote Direct Memory Access (RDMA), Transmission Control Protocol/Internet Protocol (TCP/IP), Universal Flash Storage (UFS), embedded MultiMediaCard (eMMC), InfiniBand, Serial Attached Small Computer System Interface (SCSI) (SAS), Internet SCSI (iSCSI), Serial AT Attachment (SATA), and cache-coherent interconnect protocols, such as the CXL protocols, among other possibilities.

While the above discussion uses the generic term "storage device", embodiments of the disclosure may include any storage device formats that may benefit from the use of computational storage units, examples of which may include hard disk drives (HDDs) and Solid State Drives (SSDs). Any reference to "SSD" below should be understood to include such other embodiments of the disclosure.

Figure 2:
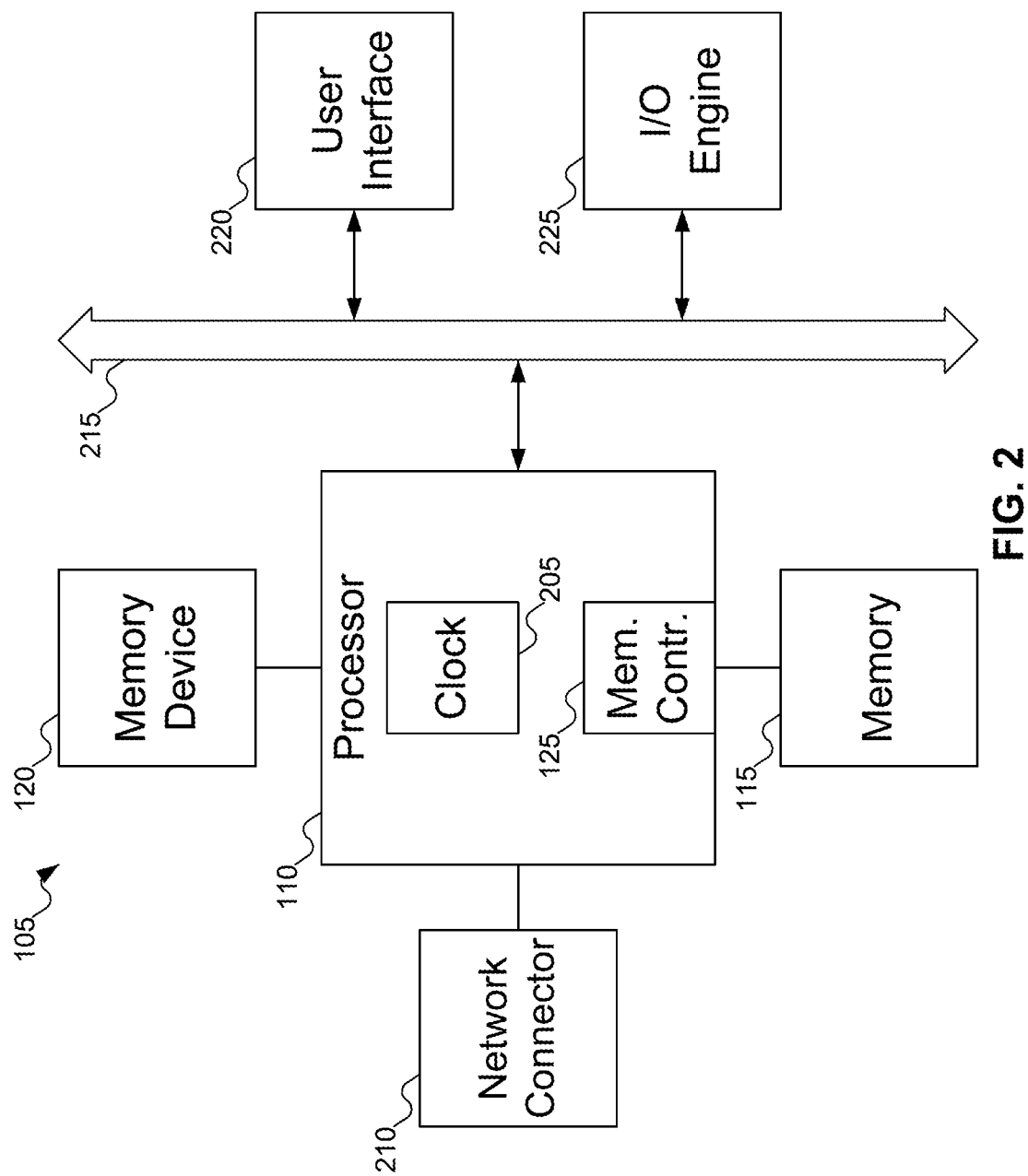
FIG. 2 shows details of the machine of FIG. 1, according to embodiments of the disclosure.

FIG. 2 shows details of the machine of FIG. 1, according to embodiments of the disclosure. In FIG. 2, typically, machine 105 includes one or more processors 110, which may include memory controllers 125 and clocks 205, which may be used to coordinate the operations of the components of the machine. Processors 110 may also be coupled to memories 115, which may include random access memory (RAM), read-only memory (ROM), or other state preserving media, as examples. Processors 110 may also be coupled to memory devices 120, and to network connector 210, which may be, for example, an Ethernet connector or a wireless connector. Processors 110 may also be connected to buses 215, to which may be attached user interfaces 220 and Input/Output (I/O) interface ports that may be managed using I/O engines 225, among other components.

Figure 3:
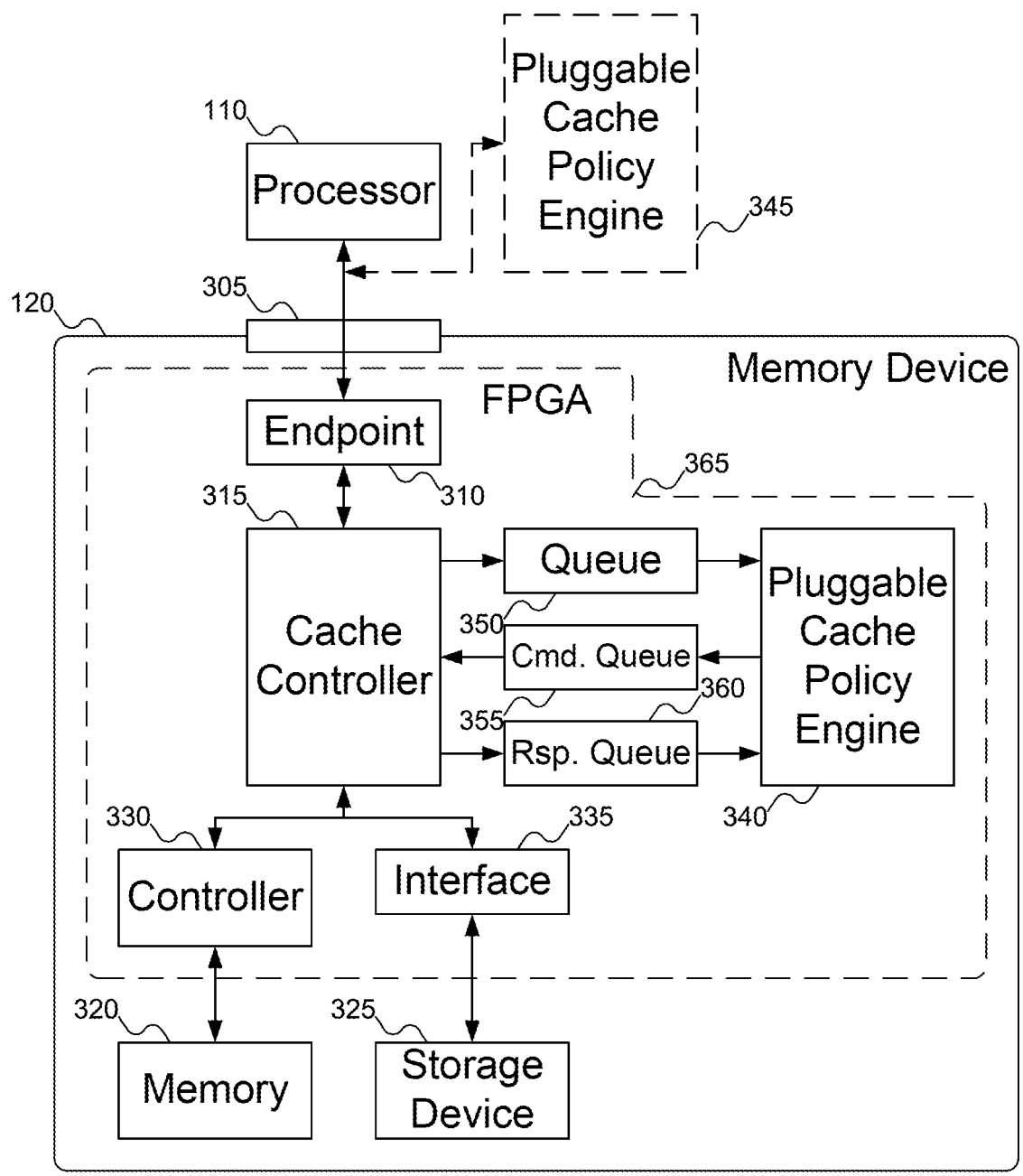
FIG. 3 shows details of the memory device of FIG. 1, according to embodiments of the disclosure.

FIG. 3 shows details of memory device 120 of FIG. 1, according to embodiments of the disclosure. In FIG. 3, memory device 120 may include interface 305, which may provide a connection with other equipment in machine 105 of FIG. 1, such as processor 110. Interface 305 may be a port or pins where a communication line, such as a cable, may be connected, or interface 305 may be an edge connector, such as might fit into a PCIe expansion slot. Interface 305 may also take other forms, all of which are considered part of embodiments of the disclosure. Interface 305 may provide a connection to a bus, such as a PCIe bus, over which communication may travel between memory device 120 and processor 110. This traffic may include communications using, for example, a cache-coherent interconnect protocol such as the CXL protocols, enabling processor 110 to access data from memory device 120. Interface 305 may provide load/store access to memory device 120 using any versions (such as versions 1.1, 2.0, or 3.0, as well as future versions) of CXL.mem, .cache, .io interfaces.

Memory device 120 may also include endpoint 310. Endpoint 310 may expose to processor 110 the functionalities of memory device 120. Endpoint 310 may inform machine 105 of FIG. 1 of the available memory capacity offered by memory device 120. This available storage may then be viewed by processor 110 as though it was an extension of memory 115 of FIG. 1

Memory device 120 may also include device cache controller 315 (which may also be referred to as a cache controller or just a controller). Cache controller 315 may be responsible for managing input/output (I/O) requests, such as load/store requests, from processor 110. For example, processor 110 may issue requests to read data from memory device 120, or to write data to memory device 120. As memory device 120 may be viewed as an extension of memory 115 of FIG. 1, these I/O requests may be issued as Load or Store requests, rather than as Read or Write requests (which are more commonly used when accessing data from a storage device than from a memory).

Cache controller 315 (which may also be referred to as a controller) may communicate with memory 320 and storage device 325, which may act as tiers in a tiered storage system. While FIG. 3 shows two tiers identified as memory 320 and storage device 325, embodiments of the disclosure may include more than two tiers, and may use any desired forms of storage for either tier. For example, one tier might include DRAM, SRAM, MRAM, or on-chip storage, and the other tier might include a hard disk drive or an SSD. One tier, such as the tier represented in FIG. 3 by memory 320 may be referred to as a first storage, and the other tier, such as the tier represented in FIG. 3 by storage device 325, may be referred to as a second storage. Alternatively, memory 320 may be thought of as a cache for data normally stored in storage device 325.

In general, the first storage may be a faster form of storage than the second storage, but also may be more expensive per unit than the second storage. For example, memory 320 is typically faster to access than an SSD or a hard disk drive. But memory 320 is also typically more expensive than an SSD or a hard disk drive on a per unit basis. Thus, instead of equipping memory device 120 just with large amounts of memory 320 (at a high cost) or just with a large SSD or hard disk drive (with slower data access), a balance may be drawn between cost and speed. Memory 320 may act as a cache for data stored on storage device 325 (hence controller 315 being referred to as cache controller 315).

But by including both memory 320 and storage device 325, cache controller 315 may need to manage which tier of storage stores a particular data. In general, because storage device 325 is large and relatively slower, storage device 325 may be a persistent storage device. By storage device 325 being persistent, memory device 120 may also guard against data loss due to unexpected events (such as a power interruption). Thus, cache controller 315 may copy data from storage device 325 to memory 320 when needed, and may delete data from memory 320 when room is needed for newer data. Cache controller 315 may also copy data back from memory 320 to storage device 325 when the data in memory 320 has been updated, to ensure the updated data is also stored on storage device 325. Note that when processor 110 issues a Store request to memory device 120, cache controller 315 may be either a write-through cache or a write-back cache. That is, in some embodiments of the disclosure, cache controller 315 may update data in both memory 320 and storage device 325 (a write-through cache), or cache controller 315 may update data only in memory 320, and may update data in storage device 325 when the data is evicted from memory 320 (a write-back cache). Embodiments of the disclosure may include cache controller 315 as either a write-through cache or a write-back cache, as well as any other variations thereof.

Cache controller 315 may access data from memory 320 via a controller, such as controller 330 (which may also be referred to as a memory controller, and which may operate similarly to controller 125 of FIG. 1, although controller 330 may be different from controller 125 of FIG. 1). For example, controller 330 might be a memory controller similar to memory controller 125 of FIG. 1. If memory 320 is replaced with a different form of storage for the first storage, then controller 330 may be similarly replaced to manage access to the replacement for memory 320. Similarly, cache controller 315 may access data from storage device 325 via an interface, such as interface 335.

In some embodiments of the disclosure, storage device 325 may use different protocols from memory 120. For example, as described above, memory device 120 may support cache-coherent interconnect protocol, whereas storage device 325 may support an NVMe protocol. Embodiments of the disclosure may support storage device 325 using any desired protocol: for example, NVMe, NVMe-oF, SAS, SATA, or SCSI. In this manner, memory device 120 may utilize storage device 325 without needing storage device 325 to natively support the protocols used by memory device 120. Thus, memory device 120 might use protocols that are not directly usable by storage device 325. In such situations, interface 335 may support sending requests using a protocol appropriate for storage device 325.

In its simplest form, cache controller 315 may receive load/store requests from processor 110, reading data from memory 320 and writing data to memory 320. If data to be read from memory 320 is not currently present in memory 320, then cache controller 315 may copy the data from storage device 325 into memory 320, then send the data back processor 110. If there is no space in memory 320 for the data being copied from storage device 325, then cache controller 315 may evict data from memory 320, after which the data may be copied from storage device 325 into memory 320. (Evicting data might just involving deleting the data from memory 320, or it might also involve copying the data from memory 320 back to storage device 325 if the data was changed (written, also referred to as dirty) while in memory 320.) Similarly, if data is to be written to memory 320, cache controller may identify some free space in memory 320 where the data may be written: if there is no space in memory 320 for the data to be written, then cache controller 315 may evict some data from memory 320, as described above, to make room for the data to be written to memory 320.

When cache controller 315 needs to evict data from memory 320, cache controller 315 may use any desired eviction algorithm. For example, cache controller 315 may use a Least Frequently Used (LFU) or a Least Recently Used (LRU) algorithm to select data to evict from memory 320. Such algorithms select for eviction data that is the least frequently used or the least recently used.

But one limitation to this simple approach is that the first time processor 110 asks to load data from an address, that data is typically not in memory 320: cache controller 315 would only copy the data from storage device 325 to memory 320 after processor 110 requests to load the data. Thus, while later accesses might be relatively fast (by loading data from memory 320), the first access may be relatively slow. (It is also possible that later accesses may also be relatively slow, if that data is evicted from memory 320 before a request to load the data is received). That data might not be in memory 320 means that the hit ratio for memory 320 (the number of times requested data is present in memory 320 relative to the total number of times data is requested) may be relatively low.

While it is possible for cache controller 315 to include a policy engine to attempt to prefetch data (that is, to fetch data that is predicted to be requested by processor 110 soon) from storage device 325 into memory 320, cache controller 315 is typically part of memory device 120 as sold by the manufacturer. Thus, whatever policy engine cache controller 315 might include to attempt to prefetch data from storage device 325 into memory 320 would be a one-size-fits-all solution, attempting to predict what data might be requested by any processor 110 running any application. Such one-size-fits-all solutions might be somewhat accurate, but are unlikely to be accurate all of the time for any application running on any processor 110. Put another way, a generic policy engine is likely to prefetch data that will not be requested by processor 110 and/or to fail to prefetch data that will be requested by processor 110. Thus, at least some of the time, the use of a generic policy engine may result in poorer performance of the system (as evicting data from memory 320 may take a few computing cycles), and any improvement in the hit ratio for memory 320 may be relatively small.

Application developers have knowledge about how their applications access data. For example, data in a database might be organized in rows and columns, with each row representing information about a particular entry and each column representing data about entries. If an application searches the database, the application developer may know that after a particular column in a particular row is accessed, various other columns in that same row may also be accessed. Thus, a policy engine tailored to work with this database searching application may know what columns will likely be accessed soon, and where those columns are located relative to the first column accessed. But such a policy engine might not work well for a different application, such as an application to locate documents that are closest to a search term, which may involve accessing data from various scattered locations across the entire dataset.

Thus, optimizing the hit ratio for memory device 120 may involve using policy engines that are tailored to the specific applications accessing data from memory device 120. This fact means that a one-size-fits-all policy engine may not be the best solution: the application developer may want to supply a policy engine that may be used to optimize the hit ratio for memory device 120.

To that end, memory device 120 may include support for pluggable cache policy engine 340. Pluggable cache policy engine (which may also be referred to as a pluggable policy engine, or just a policy engine where context distinguishes such a policy engine from a policy engine built into cache controller 315) may be added to memory device 120 by the application developer.

To support pluggable cache policy engine 340 being added after manufacture of memory device 120, memory device 120 may include support for pluggable cache policy engine 340. In some embodiments of the disclosure, memory device 120 may include a port, connection, or other interface where pluggable cache policy engine 340 may be connected to memory device 120. For example, memory device 120 may include a socket where a chip, circuit, or any other hardware element containing pluggable cache policy engine 340 may be installed. Or, memory device 120 may include a socket, much like a motherboard may include a PCIe expansion socket, where an edge connector for an expansion card including pluggable cache policy engine 340 may be installed.

In other embodiments of the disclosure, memory device 120 may include a processor, into which pluggable cache policy engine 340 may be loaded as firmware, software, or other forms of instructions. The processor may then execute the firmware, software, or instructions containing pluggable cache policy engine 340 to implement pluggable cache policy engine 340.

In yet other embodiments, memory device 120 might not actually include a connection or internal support for pluggable cache policy engine 340. Instead, pluggable cache policy engine 340 may be implemented outside of memory device 120, and may communicate with memory device 120 via some connection. For example, as shown in FIG. 3, pluggable cache policy engine 345 (shown with dashed lines, to distinguish it from embodiments of the disclosure where pluggable cache policy engine 340 is supported as part of memory device 120) may communicate with memory device 120 via interface 305, across the same bus as processor 110. Alternatively, pluggable cache policy engine 345 may connect to memory device 120 via an interface separate from interface 305 (such second interface is not shown in FIG. 3), which may take any desired form. In the remainder of this document, any discussion regarding pluggable cache policy engine 340 may be understood to be equally applicable to pluggable cache policy engine 345, without specific reference to pluggable cache policy engine 345.

Cache controller 315 and pluggable cache policy engine 340 may communicate using queues 350, 355, and 360. Cache controller 315 may inform pluggable cache policy engine 340 about requests received from processor 110 via queue 350. That is, whenever cache controller 315 receives a load/store request from processor 110, cache controller 315 may provide information about that load/store request to pluggable cache policy engine 340 using queue 350. This information may include the address provided by processor 110 associated with the data (for example, a physical memory address or host page address), the size of the data, or whether the data is being read or written. Cache controller 315 may also provide additional information associated with the data, such as its temperature (whether the data is considered hot—accessed recently—or cold—accessed a while ago), how often or how frequently the data has been accessed by processor 110, or when the data was last accessed by processor 110. Cache controller 315 may also provide additional information to pluggable cache policy engine 340: for example, if satisfying a load/store request from processor 110 involved evicting other data from memory 320. Pluggable cache policy engine 340 may then use this information in making decisions about what cache controller 315 should keep in memory 320 or in storage device 325.

Note that the above discussion describes the address associated with the data as potentially being a "physical memory address". From the perspective of processor 110, the address is a "physical address": processor 110 thinks it is referencing a particular physical memory address, just as though the address were in memory 110 of FIG. 1. But from the perspective of memory device 120, the address is not the physical address where the data in question is stored: the address is a logical address, that might only identify the data but not its physical location. For example, memory 320 might not be large enough to store all the data stored in memory device 120, and may instead be used to "cache" data that is persistently stored in storage device 325. As such, the address in memory 320 where any particular data may change as data is moved in and out of memory 320, even though processor 110 may be agnostic to such data movement. Thus, any reference to a "physical address" may be understood to be a relative term, and not necessarily indicating the exact address where the data is actually stored.

When pluggable cache policy engine 340 wants to instruct cache controller 315 to take some action, pluggable cache policy engine 340 send a command to cache controller 315 using command queue 355. Cache controller 315 may then process the command send a response to pluggable cache policy engine 340 using response queue 360.

In some embodiments of the disclosure, queues 350, 355, and 360 may be First In, First Out (FIFO) queues. In other embodiments of the disclosure, other types of queues may be used: for example, priority queues or circular buffers. In addition, while FIG. 3 shows one command queue 355 and one response queue 360, embodiments of the disclosure may include multiple command queues 355 and/or response queues 360. For example, memory device 120 may implement various priority levels, and may offer different command queues 355 and/or response queues 360 for different priority levels. In this manner, pluggable cache policy engine 340 may issue commands of relative priority that cache controller 315 may process in a manner consistent with the commands' relative priorities. But in general, it may be expected that cache controller 315 may process commands in the same order as they are sent by pluggable cache policy engine 340: that is, command queue 355 and/or response queue 360 may be FIFO queues.

To determine what commands to issue to cache controller 315, pluggable cache policy engine 340 may store some metadata and may maintain some data structures about host accesses. For example, as information about load/store requests issued by processor 110 are received by cache controller 315 and forwarded to pluggable cache policy engine 340 using queue 350, pluggable cache policy engine 340 may store this information. Pluggable cache policy engine 340 may store metadata anywhere desired. For example, pluggable cache policy engine 340 may include its own storage for data it uses. Or, pluggable cache policy engine 340 may use a portion of memory 320 and/or storage device 325 to store its data. Such a portion of memory 320 and/or storage device 325 may be allocated for use by pluggable cache policy engine 340 (but otherwise usable by processor 110), or such portions may be reserved for use by pluggable cache policy engine 340 (and not usable by processor 110).

Memory device 120 may include circuitry to implement endpoint 310, cache controller 315, controller 330, interface 335, a processor for firmware for pluggable cache policy engine 340, and queues 350, 355, and 360. Such circuitry may include a Field Programmable Gate Array (FPGA), an Application-Specific Integrated Circuit (ASIC), a System-on-a-Chip (SoC), a single core processor or a multi-core processor, a Central Processing Unit (CPU), a Graphics Processing Unit (GPU), a General Purpose GPU (GPGPU), a Tensor Processing Unit (TPU), or a Neural Processing Unit (NPU), among other possibilities, represented in FIG. 3 as FPGA 365.

Figure 4:
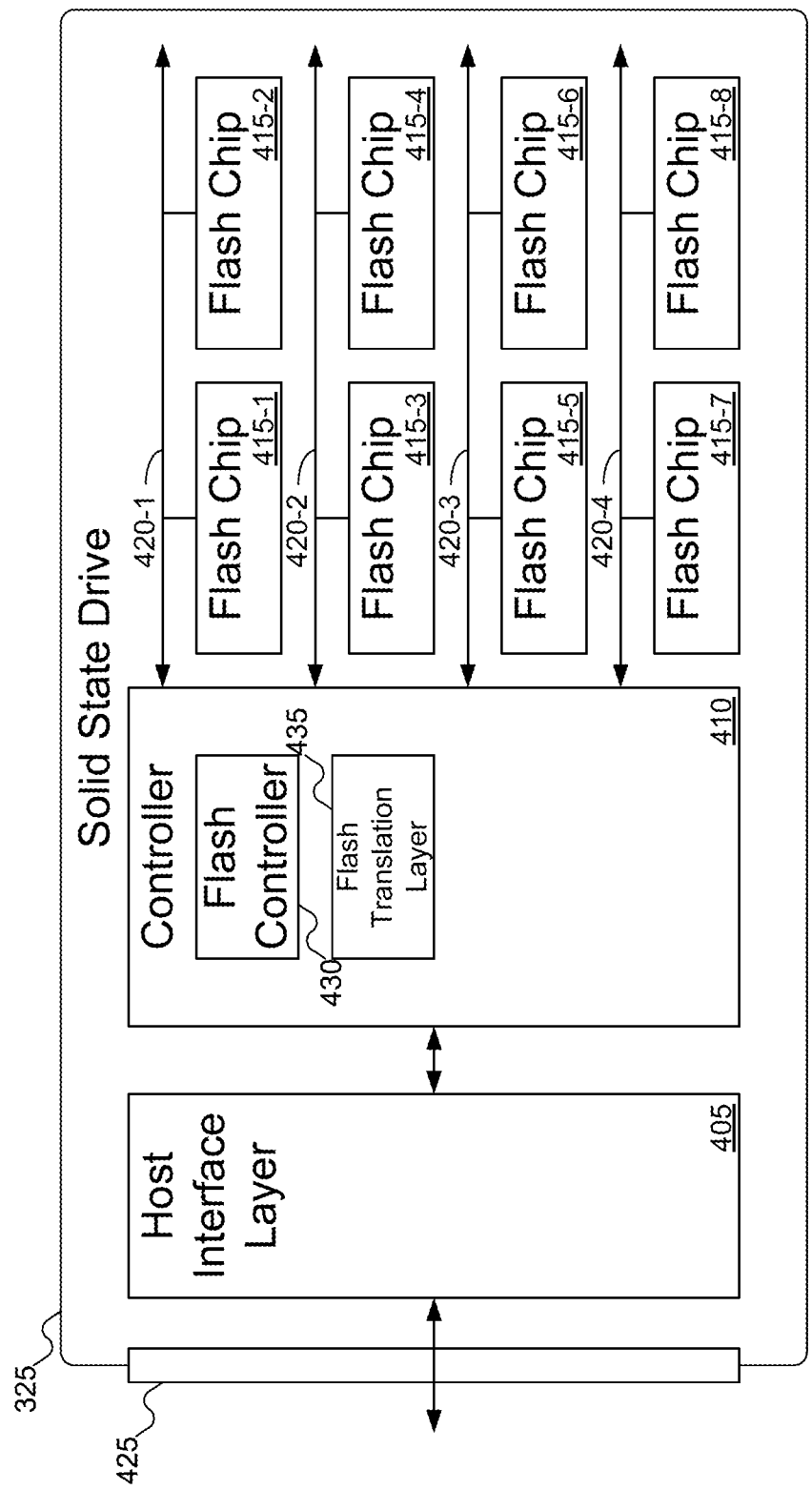
FIG. 4 shows details of the storage device of FIG. 3, according to embodiments of the disclosure.

FIG. 4 shows details of storage device 325 of FIG. 3, according to embodiments of the disclosure. In FIG. 4, the implementation of storage device 325 is shown as for a Solid State Drive (SSD), but embodiments of the disclosure may include other implementations, such as a hard disk drive. In FIG. 4, storage device 325 may include host interface layer (HIL) 405, controller 410 (not to be confused with controller 330 of FIG. 3, which controls access to memory 320 of FIG. 3: controller 410 may also be referred to as a storage controller), and various flash memory chips 415-1 through 415-8 (also termed "flash memory storage"), which may be organized into various channels 420-1 through 420-4. Host interface layer 405 may manage communications between storage device 325 and other components (such as processor 110 of FIG. 1). Host interface layer 405 may also manage communications with devices remote from storage device 325: that is, devices in communication with storage device 325, possibly over one or more network connections. These communications may include read requests to read data from storage device 325, write requests to write data to storage device 325, and delete requests to delete data from storage device 325. Note that storage device 325 may process requests to read or write data from cache controller 315 of FIG. 3 without knowledge that such requests originate from cache controller 315 of FIG. 3 and not from processor 110 of FIG. 1.

Host interface layer 405 may manage an interface across only a single port, or it may manage interfaces across multiple ports. Alternatively, storage device 325 may include multiple ports, each of which may have a separate host interface layer 405 to manage interfaces across that port. Embodiments of the inventive concept may also mix the possibilities (for example, an SSD with three ports might have one host interface layer to manage one port and a second host interface layer to manage the other two ports). Host interface layer 405 may communicate with other components across connection 425, which may be, for example, a PCIe connection, an M.2 connection, a U.2 connection, a SCSI connection, or a SATA connection, among other possibilities.

SSD controller 410 may manage the read and write operations, along with garbage collection and other operations, on flash memory chips 415-1 through 415-8 using flash memory controller 430. Note that SSD controller 410 may be different from cache controller 315 of FIG. 3, as they offer different functionality: SSD controller 415 may manage reading data from and writing data to flash chips 415, whereas controller 315 of FIG. 3 may manage what data is cached in memory 320 of FIG. 3. SSD controller 410 may also include flash translation layer 435, which may manage the mapping of logical block addresses (LBAs) (as used by host 105 of FIG. 1) to physical block addresses (PBAs) where the data is actually stored on storage device 325. By using flash translation layer 435, host 105 of FIG. 1 does not need to be informed when data is moved from one block to another within storage device 325.

While FIG. 4 shows storage device 325 as including eight flash memory chips 415-1 through 415-8 organized into four channels 420-1 through 420-4, embodiments of the inventive concept may support any number of flash memory chips organized into any number of channels. Similarly, while FIG. 4 shows the structure of a SSD, other storage devices (for example, hard disk drives) may be implemented using a different structure from that shown in FIG. 4 to manage reading and writing data, but with similar potential benefits.

While FIG. 4 shows storage device 325 as being just a storage device, embodiments of the disclosure may include other components within storage device 325. For example, storage device 325 might have its own computational storage unit, which might be used by processor 110 of FIG. 1.

In some embodiments of the disclosure, the functionality of memory device 120 of FIG. 1 may be incorporated into storage device 325 to create an integrated device solution. For example, storage device 325 might include memory 320 of FIG. 3, cache controller 315 of FIG. 3, pluggable cache policy engine 340 of FIG. 3, and queues 350, 355, and 360 of FIG. 3.

Figure 5:
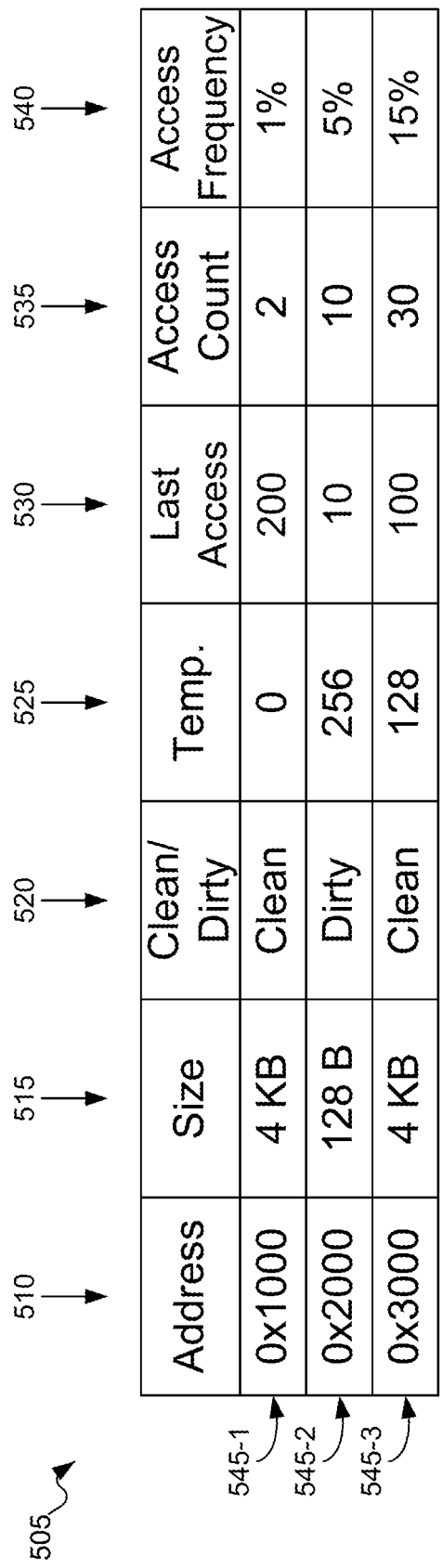
FIG. 5 shows details of metadata managed by the cache controller of FIG. 3, according to embodiments of the disclosure.

FIG. 5 shows details of metadata managed by cache controller 315 of FIG. 3, according to embodiments of the disclosure. In FIG. 5, cache controller 315 of FIG. 3 may manage metadata 505. Metadata 505 may be stored in any desired location: for example, in memory 320 of FIG. 3, in storage device 325 of FIG. 3, or in a storage within cache controller 315 of FIG. 3. In some embodiments of the disclosure, metadata 505 may include information for all data accessed by processor 110 of FIG. 1; in other embodiments of the disclosure, metadata 505 may be limited to just the data currently cached in memory 320 of FIG. 3.

Metadata 505 may include address 510 of data, size 515 of the data, clean/dirty status 520 of the data (that is, whether or the data stored in memory 320 of FIG. 3 is unchanged since it was copied from storage device 325 of FIG. 3 into memory 320 of FIG. 3), temperature 525 of the data, last access time 530 for the data, access count 535 for the data, and/or access frequency 540 for the data. Metadata may include entries 545-1, 545-2, and 545-3 (which may be referred to collectively as entries 545) for each data being tracked. Thus, for example, as shown in FIG. 5 metadata 505 may currently be tracking three data. While FIG. 5 shows three entries 545, embodiments of the disclosure may include any number (zero or more) of entries 545.

Some additional details about some of metadata 505 may be useful. In some embodiments of the disclosure, temperature 525 may be measured using a scale. For example, the scale may range from zero to 256, with zero indicating the coldest possible data and 256 indicating the hottest possible data (values between zero and 256 may indicate relative coldness or hotness). Thus, entry 545-2, with a temperature of 256, is currently the hottest data in metadata 505, whereas entry 545-1, with a temperature of zero, is currently the coldest data in metadata 505. But in other embodiments of the disclosure, temperature may be represented in other ways or using other scales. For example, temperature 525 might use a scale from zero to one, with zero indicating the coldest possible temperature and one indicating the hottest possible temperature. Or, temperature 525 might simply use a single bit, again with zero represent cold and one representing hot.

Last access time 530 may provide similar information to temperature 525, in that generally data that has been accessed more recently may be considered hotter. But this correlation is not guaranteed. For example, as discussed below, pluggable cache policy engine 340 of FIG. 3 may issue a command to set the temperature for a particular data, which may not be consistent with when the data was last accessed.

Temperature 525 may also provide an alternative mechanism for cache controller 315 of FIG. 3 to select data to evict from memory 320 of FIG. 3. Rather than looking for the least recently used or least frequently used data in metadata 505, cache controller 315 of FIG. 3 may select the data with the coldest temperature.

In FIG. 5, last access time 545 is shown as representing a number of units. These units may be units of time: for example, seconds, milliseconds (ms), microseconds (μs), or nanoseconds (ns). Or, these units may be clock cycles. Embodiments of the disclosure may also include other types of units for last access time 545. But in other embodiments of the disclosure, rather than reflecting how long it has been (in whatever units are used) since the data was last accessed, last access time 545 may include a time (as measured by clock 205 of FIG. 2 or any other clock) when the data was last accessed. By storing a time when the data was last accessed, last access time 545 may avoid being updated with the passage of units of time.

Access count 535 may count the number of times processor 110 of FIG. 1 has issued load/store requests to access the data (at least, since entries 545 were added to metadata 505). Access frequency 540 may indicate what percentage of load/store requests from processor 110 of FIG. 1 were to access the data (again, at least since entries 545 were added to metadata 505). In general, there may be a correlation between access count 535 and access frequency 540: access count 535, divided by the total number of load/store requests issued by processor 110 of FIG. 1, may be used to compute access frequency 540. Thus, in some embodiments of the disclosure, metadata 505 might only include one of access count 535 or access frequency 540, as either is derivable from the other given the total number of load/store requests sent by processor 110 of FIG. 1.

Note that there is not necessarily a correlation between how often data is accessed (as represented by access count 535 or access frequency 540) and temperature 525. For example, entry 545-3 has a higher access count 535/access frequency 540 than entry 545-2, but entry 545-2 has a higher temperature 525 than entry 545-3. This lack of correlation may be due to other factors: for example, last access time 530 (if entry 545-2 was accessed more recently than entry 545-3, that might explain its higher temperature despite its lower access count/access frequency). But in some embodiments of the disclosure, there may be a correlation between access count 535 and/or access frequency 540 and temperature 525.

Figure 6:
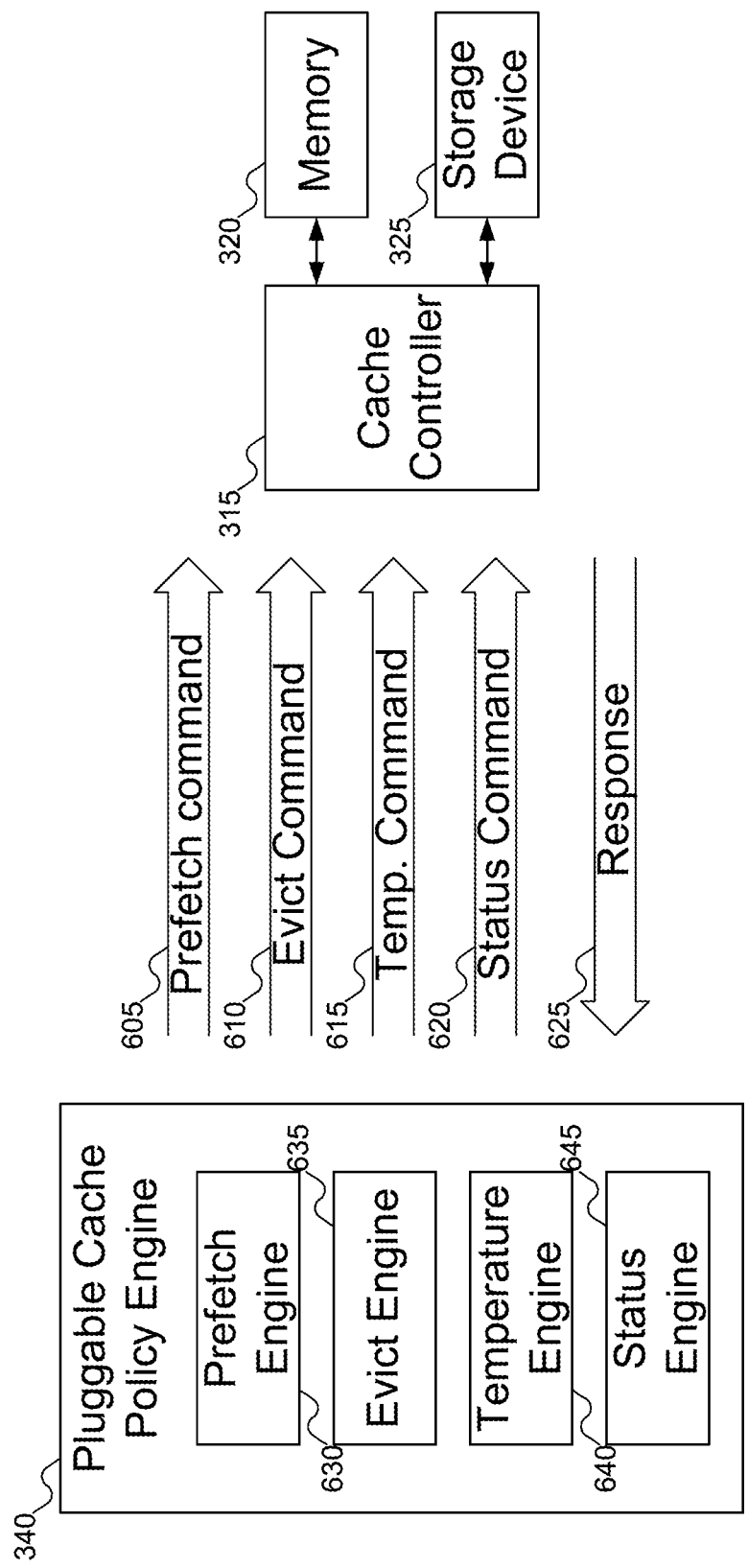
FIG. 6 shows the pluggable cache policy engine of FIG. 3 sending various commands to the cache controller of FIG. 3, according to embodiments of the disclosure.

FIG. 6 shows pluggable cache policy engine 340 of FIG. 3 sending various commands to cache controller 315 of FIG. 3, according to embodiments of the disclosure. In FIG. 6, pluggable cache policy engine 340 may send various commands, such as prefetch command 605, evict command 610, temperature command 615, or status command 620, to cache controller 315. Prefetch command 605 may instruct cache controller 315 to copy data from storage device 325 to memory 320. Evict command 610 may instruct cache controller 315 to evict data from memory 320 (which may include writing data to storage device 325, if the data has been written by processor 110 of FIG. 1 into memory 320 and not yet written to storage device 325). Temperature command may instruct cache controller 315 to set a particular data to a particular temperature (which may encourage or discourage cache controller 315 from evicting that data from memory 320 to make room for new data). Status command 620 may ask cache controller 315 for the status of a particular data. The status of the data may include the information normally provided by cache controller when processor 110 of FIG. 1 accesses the data-its address 510 of FIG. 5, size 515 of FIG. 5, clean/dirty status 520 of FIG. 5, temperature 525 of FIG. 5, or access information, such as last access time 530 of FIG. 5, access count 535 of FIG. 5, or access frequency 540 of FIG. 5. But the status of the data may also include whether the data is currently in memory 320 or not.

It might not be clear why pluggable cache policy engine 340 might want to know whether or not a particular data is currently in memory 320. After all, cache controller 315 provides information to pluggable cache policy engine 340 about every load/store request received from processor 110 of FIG. 1, so pluggable cache policy engine should know what data is currently in memory 320. The answer is that pluggable cache policy engine 340, while it may be designed with knowledge about the data access patterns of the application running on processor 110 of FIG. 1, might still make mistakes. For example, pluggable cache policy engine 340 might send evict command 610 for a data that processor 110 of FIG. 1 simultaneously asks to access. Since the application actually needs the data (based on the fact that processor 110 of FIG. 1 sent the load/store request), this inconsistency should be resolved in favor of the application, and evict command 610 should be ignored. While cache controller 315 may inform pluggable cache policy engine 340 that evict command 610 was not performed, pluggable cache policy engine 340 might want more information.

In addition, even though cache controller 315 is supposed to keep pluggable cache policy engine 340 up-to-date with information about load/store requests from processor 110 of FIG. 1, it is possible for cache controller 315 and pluggable cache policy engine 340 to become out-of-sync, in which case pluggable cache policy engine 340 might want more current information.

Regardless of what command pluggable cache policy engine 340 might send to cache controller 315, cache controller 315 may send back response 625, letting pluggable cache policy engine 340 know what happened with the command.

Pluggable cache policy engine 340 may include various engines to handle the various commands. For example, pluggable cache policy engine 340 may include policy engine 630, evict engine 635, temperature engine 640, and/or status engine 645. Each engine may be responsible for sending the corresponding type of command.

It might be noted that there has been no discussion about how the various engines are implemented, to decide what data to prefetch, evict, or set a temperature for. The reason is that the implementation of pluggable cache policy engine 340 (and its various sub-engines) depends greatly on the application being run that uses the data. As noted above, typically there is no one-size-fits-all cache policy engine: what works well for one application might not work well for another application. Thus, pluggable cache policy engine 340 may be implemented to work specifically with a particular application, leveraging information about how that application operates, and its typical data access patterns, to decide how to manage the data in memory 320. But since the implementation of pluggable cache policy engine 340 may depend on the application pluggable cache policy engine 340 is designed to support, a particular implementation of pluggable cache policy engine 340 may not be described.

Figure 7:
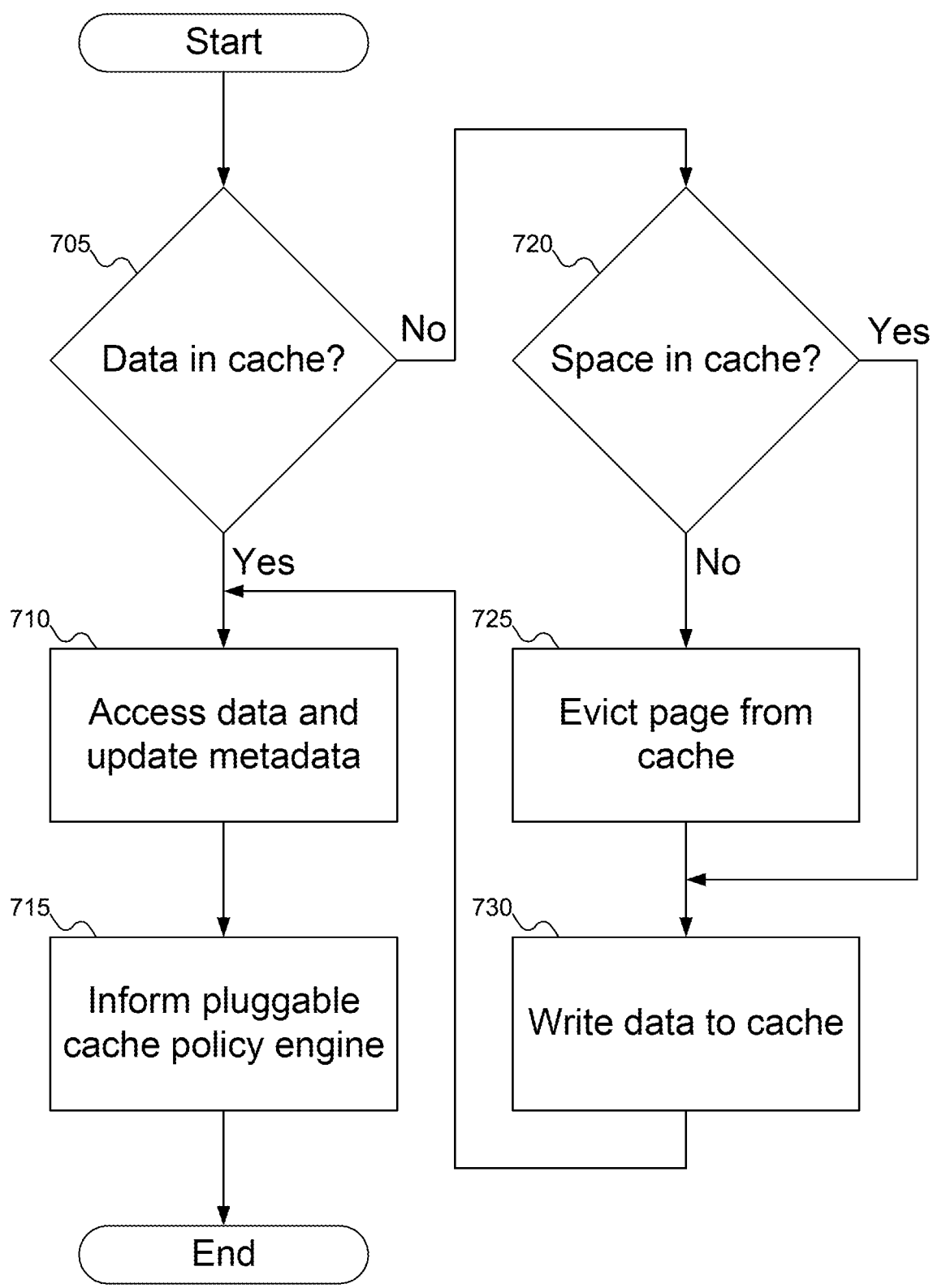
FIG. 7 shows a flowchart of an example procedure for the cache controller of FIG. 3 to return data to the host of FIG. 1 and to inform the pluggable cache policy engine of FIG. 3, according to embodiments of the disclosure.

FIG. 7 shows a flowchart of an example procedure for cache controller 315 of FIG. 3 to return data to host 105 of FIG. 1 and to inform pluggable cache policy engine 340 of FIG. 3, according to embodiments of the disclosure. In FIG. 7, it is assumed that processor 110 of FIG. 1 has issued some load/store request to memory device 120 of FIG. 1. At block 705, cache controller 315 of FIG. 3 may determine if the data being accessed (either read or written) is currently in memory 320 of FIG. 3. If so, then at block 710, cache controller 315 of FIG. 3 may access the data and may update metadata 505 of FIG. 5 accordingly, after which at block 715 cache controller 315 of FIG. 3 may inform pluggable cache policy engine 340 of FIG. 3 about the load/store request.

If the data is not currently in memory 320 of FIG. 3, then at block 720, cache controller 315 of FIG. 3 may check to see if there is space in memory 320 of FIG. 3 to store the data. If not, then at block 725, cache controller 315 of FIG. 3 may evict some data from memory 320 of FIG. 3, after which there is space in memory 320 of FIG. 3 for the data. Then, at block 730, cache controller 315 of FIG. 3 may copy the data from storage device 325 of FIG. 3 into memory 320 of FIG. 3, after which processing may continue at block 710 as described above.

Figure 8:
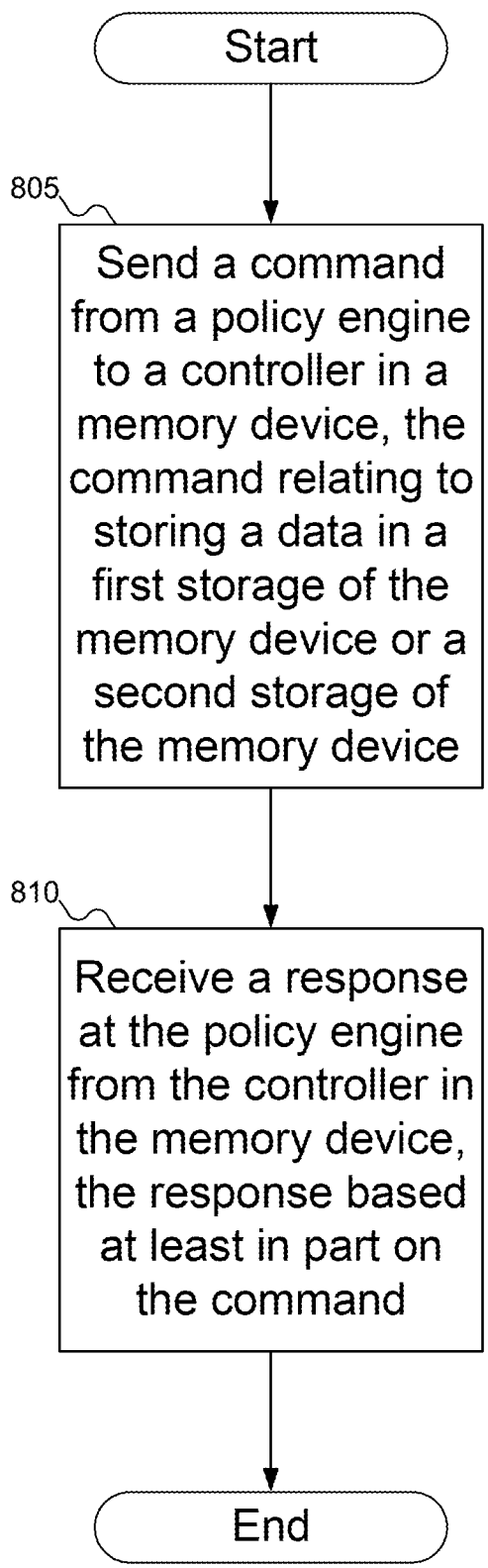
FIG. 8 shows a flowchart of an example procedure for the pluggable cache policy engine of FIG. 3 to issue commands to the cache controller of FIG. 3, according to embodiments of the disclosure.

FIG. 8 shows a flowchart of an example procedure for pluggable cache policy engine 340 of FIG. 3 to issue commands to cache controller 315 of FIG. 3, according to embodiments of the disclosure. In FIG. 8, at block 805, pluggable cache policy engine 340 of FIG. 3 may send a command, such as commands 605-620 of FIG. 6, to cache controller 315 of FIG. 3. This command may relate to the management of data stored in memory 320 of FIG. 3 and/or storage device 325 of FIG. 3. At block 810, pluggable cache policy engine 340 of FIG. 3 may receive response 625 of FIG. 6 from cache controller 315 of FIG. 3.

Figure 9:
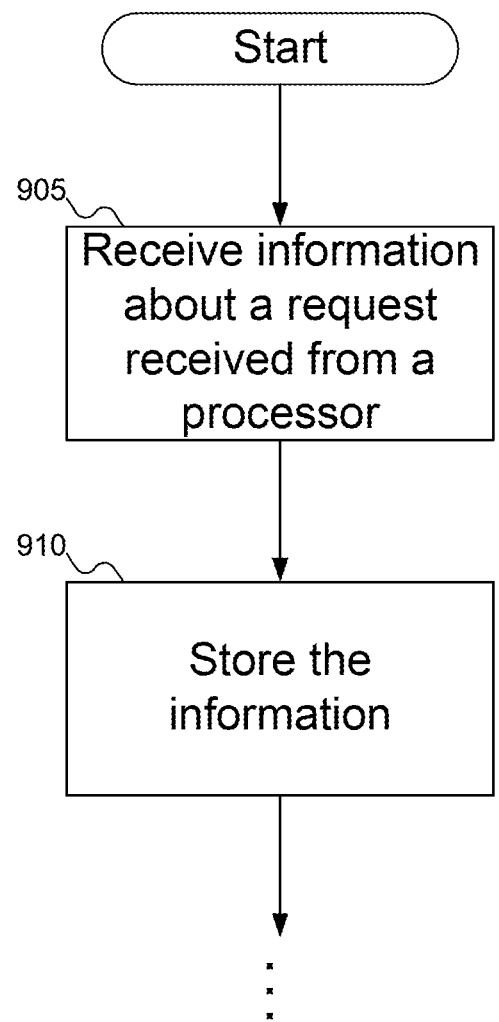
FIG. 9 shows a flowchart of an example procedure for the pluggable cache policy engine of FIG. 3 to receive information from the cache controller of FIG. 3 about requests from the host of FIG. 1, according to embodiments of the disclosure.

FIG. 9 shows a flowchart of an example procedure for pluggable cache policy engine 340 of FIG. 3 to receive information from cache controller 315 of FIG. 3 about requests from host 105 of FIG. 1, according to embodiments of the disclosure. The operations shown in FIG. 9 may precede the operations shown in FIG. 8 above. In FIG. 9, at block 905, pluggable cache policy engine 340 of FIG. 3 may receive information from cache controller 315 of FIG. 3 about load/store requests received from processor 110 of FIG. 1. At block 910, pluggable cache policy engine 340 of FIG. 3 may store the information received from cache controller 315 of FIG. 3. Processing may then continue at block 805 of FIG. 8, with pluggable cache policy engine 340 of FIG. 3 instructing cache controller 315 of FIG. 3 regarding how to manage data in memory 320 of FIG. 3 and/or storage device 325 of FIG. 3.

FIG. 10 shows a flowchart of an example procedure for pluggable cache policy engine 340 of FIG. 3 to send prefetch command 605 of FIG. 6 to cache controller 315 of FIG. 3, according to embodiments of the disclosure. In FIG. 10, at block 1005, pluggable cache policy engine 340 of FIG. 3 may select a data for prefetching from storage device 325 of FIG. 3 into memory 320 of FIG. 3. At block 1010, pluggable cache policy engine 340 of FIG. 3 may send prefetch command 605 of FIG. 6 to cache controller 315 of FIG. 3. Finally, at block 1015, pluggable cache policy engine 340 of FIG. 3 may receive response 625 of FIG. 6 from cache controller 315 of FIG. 3 regarding the execution of prefetch command 605 of FIG. 6.

FIG. 11 shows a flowchart of an example procedure for pluggable cache policy engine 340 of FIG. 3 to send evict command 610 of FIG. 6 to cache controller 315 of FIG. 3, according to embodiments of the disclosure. In FIG. 11, at block 1105, pluggable cache policy engine 340 of FIG. 3 may select a data for eviction from memory 320 of FIG. 3. At block 1110, pluggable cache policy engine 340 of FIG. 3 may send evict command 610 of FIG. 6 to cache controller 315 of FIG. 3. Finally, at block 1115, pluggable cache policy engine 340 of FIG. 3 may receive response 625 of FIG. 6 from cache controller 315 of FIG. 3 regarding the execution of evict command 610 of FIG. 6.

Figure 12:
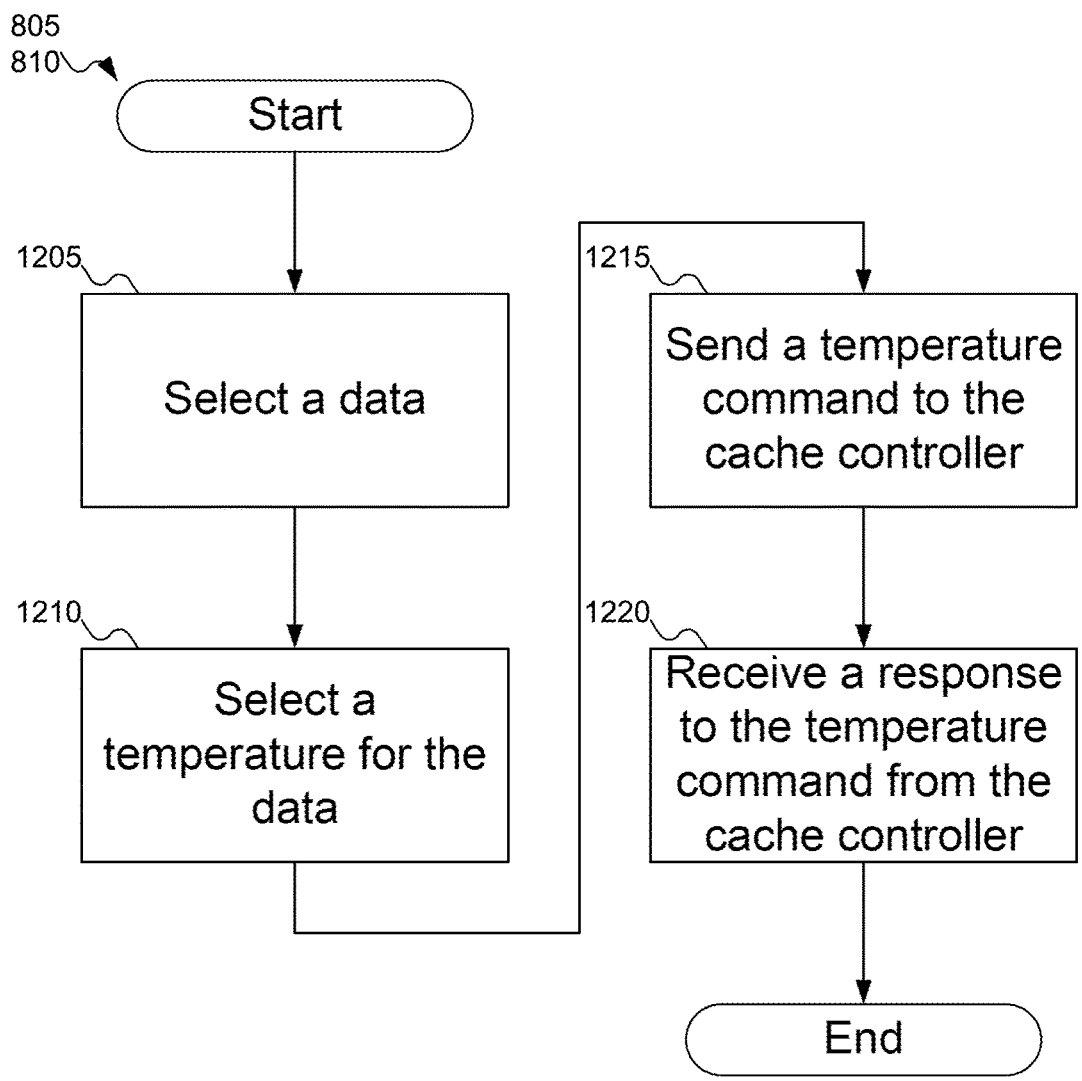
FIG. 12 shows a flowchart of an example procedure for the pluggable cache policy engine of FIG. 3 to send a temperature command to the cache controller of FIG. 3, according to embodiments of the disclosure.

FIG. 12 shows a flowchart of an example procedure for pluggable cache policy engine 340 of FIG. 3 to send temperature command 615 of FIG. 6 to cache controller 315 of FIG. 3, according to embodiments of the disclosure. In FIG. 12, at block 1205, pluggable cache policy engine 340 of FIG. 3 may select a data whose temperature 525 of FIG. 5 is to be set. At block 1210, pluggable cache policy engine 340 of FIG. 3 may select temperature 525 of FIG. 5 for the selected data. At block 1215, pluggable cache policy engine 340 of FIG. 3 may send temperature command 615 of FIG. 6 to cache controller 315 of FIG. 3. Finally, at block 1220, pluggable cache policy engine 340 of FIG. 3 may receive response 625 of FIG. 6 from cache controller 315 of FIG. 3 regarding the execution of temperature command 615 of FIG. 6.

FIG. 13 shows a flowchart of an example procedure for pluggable cache policy engine 340 of FIG. 3 to send status command 620 of FIG. 6 to cache controller 315 of FIG. 3, according to embodiments of the disclosure. In FIG. 13, at block 1305, pluggable cache policy engine 340 of FIG. 3 may select a data whose status is to be ascertained. At block 1310, pluggable cache policy engine 340 of FIG. 3 may send status command 620 of FIG. 6 to cache controller 315 of FIG. 3. Finally, at block 1315, pluggable cache policy engine 340 of FIG. 3 may receive response 625 of FIG. 6 from cache controller 315 of FIG. 3 regarding the execution of status command 620 of FIG. 6.

FIG. 14 shows a flowchart of an example procedure for cache controller 315 of FIG. 3 to inform pluggable cache policy engine 340 of FIG. 3 about requests from host 105 of FIG. 1, according to embodiments of the disclosure. In FIG. 14, at block 1405, cache controller 315 of FIG. 3 may receive an load/store request from processor 110 of FIG. 1. At block 1410, cache controller 315 of FIG. 3 may process the load/store request received from processor 110 of FIG. 1 using memory 320 of FIG. 3 or storage device 325 of FIG. 3. Finally, at block 1415, cache controller 315 of FIG. 3 may send information about the load/store request to pluggable cache policy engine 340 of FIG. 3. This information may include information included with the request, such as address 510 of FIG. 5 of the data, size 515 of FIG. 5 of the data, clean/dirty status 520 of FIG. 5 of the data (that is, whether the load/store request is to read or write the data), or host-supplied metadata, or information associated with the request, such as the time of the load/store request (which may be last access time 530 of FIG. 5 of the data), or access count 535 of FIG. 5 or access frequency 540 of FIG. 5 of the data.

FIG. 15 shows a flowchart of an example procedure for cache controller 315 of FIG. 3 to update metadata 505 of FIG. 5, according to embodiments of the disclosure. The operations shown in FIG. 15 may follow the operations shown in FIG. 14 above, or may occur somewhere within FIG. 14 after block 1405 of FIG. 14 (for example, before block 1415 of FIG. 14). In block 15, at block 1505, cache controller 315 of FIG. 3 may update metadata 505 of FIG. 5 based upon the load/store request received from processor 110 of FIG. 1 in block 1405 of FIG. 14.

FIG. 16 shows a flowchart of an example procedure for cache controller 315 of FIG. 3 to receive commands from pluggable cache policy engine 340 of FIG. 3, according to embodiments of the disclosure. In FIG. 16, at block 1605, cache controller 315 of FIG. 3 may receive a command, such as commands 605-620 of FIG. 6, from pluggable cache policy engine 340 of FIG. 3. At block 1610, cache controller 315 of FIG. 3 may process the command received from pluggable cache policy engine 340 of FIG. 3. Finally, at block 1615, cache controller may send response 625 of FIG. 6 to pluggable cache policy engine 340 of FIG. 3.

Figure 17:
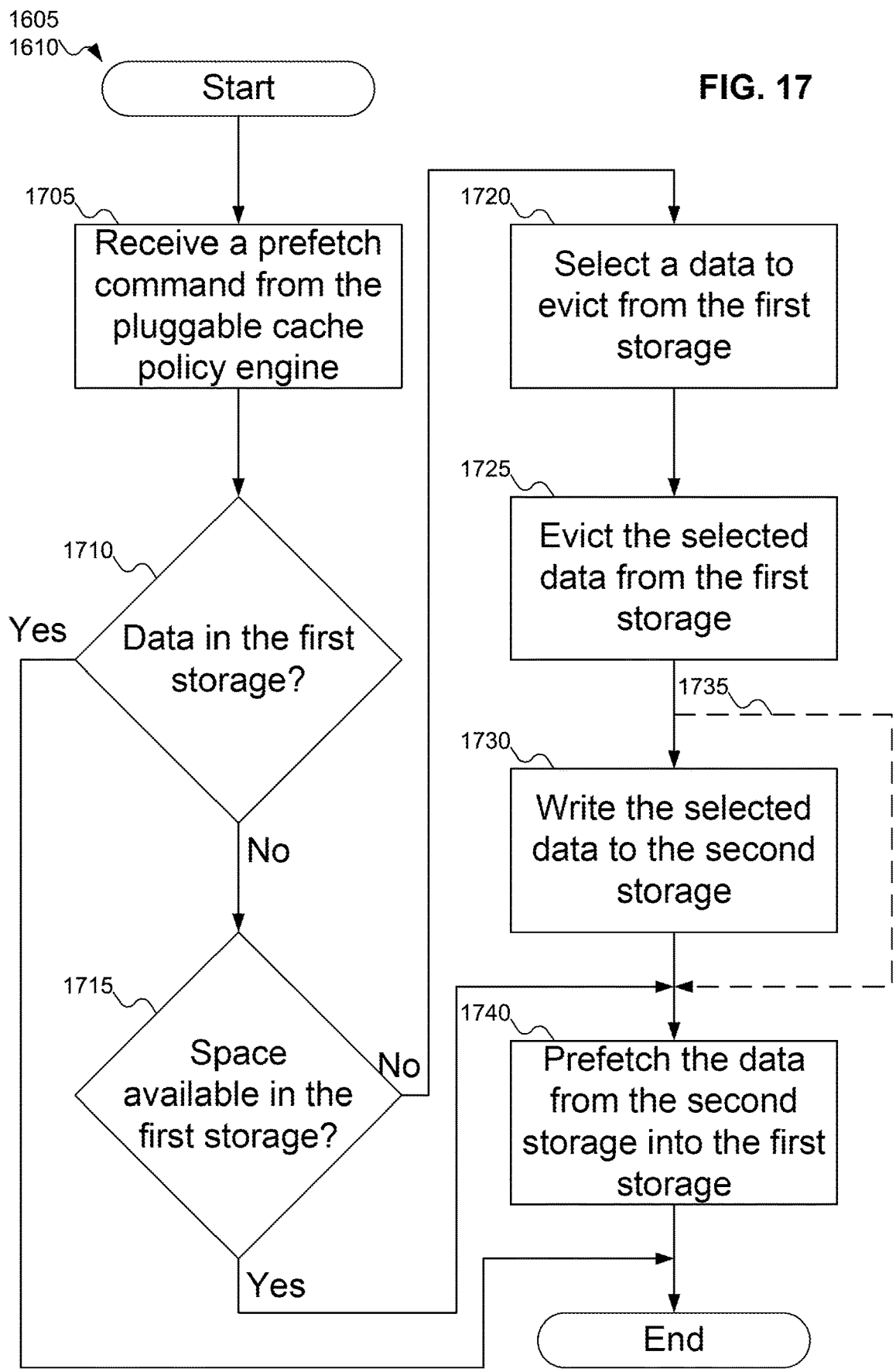
FIG. 17 shows a flowchart of an example procedure for the cache controller of FIG. 3 to process a prefetch command received from the pluggable cache policy engine of FIG. 3, according to embodiments of the disclosure.

FIG. 17 shows a flowchart of an example procedure for cache controller 315 of FIG. 3 to process prefetch command 605 of FIG. 6 received from pluggable cache policy engine 340 of FIG. 3, according to embodiments of the disclosure. In FIG. 17, at block 1705, cache controller 340 may receive prefetch command 605 of FIG. 6 from pluggable cache policy engine 340 of FIG. 3. At block 1710, cache controller 315 of FIG. 3 may check whether the data to be prefetched is already present in memory 320 of FIG. 3: if so, then the remaining processing may be skipped. Note that in some embodiments of the disclosure, the data may be assumed not to be in memory 320 of FIG. 3 given that pluggable cache policy engine 340 of FIG. 3 sent prefetch command 605 of FIG. 6, in which case block 1710 may be omitted.

Assuming that the data is not currently in memory 320 of FIG. 3, then at block 1715, cache controller 315 of FIG. 3 may check to see if there is space in memory 320 of FIG. 3 to store the data to be prefetched. If not, then at block 1720, cache controller 315 of FIG. 3 may select a data currently in memory 320 of FIG. 3 to be evicted. This selection may be based, for example, on temperature 525 of FIG. 5 of the data (the coldest data may be selected for eviction), or on access count 535 of FIG. 5 or access frequency 540 of FIG. 5 of the data (the data with the lowest access count 535 of FIG. 5 or the lowest access frequency 540 of FIG. 5 may be selected for eviction). At block 1725, the data selected by cache controller 315 of FIG. 3 for eviction from memory 320 of FIG. 3 may then be evicted from memory 320 of FIG. 3. This may involve writing the data selected for eviction back to storage device 325 of FIG. 3, as shown at block 1730, if the data selected for eviction was dirty (that is, not yet written to storage device 325 of FIG. 3); if the data did not need to be written back to storage device 325 of FIG. 3, then block 1730 may be omitted, as shown by dashed line 1735. Finally, at block 1740, memory 320 of FIG. 3 is known to have space the data to be prefetched according to prefetch command 605 of FIG. 6, and the data may be prefetched from storage device 325 of FIG. 3 to memory 320 of FIG. 3.

Figure 18:
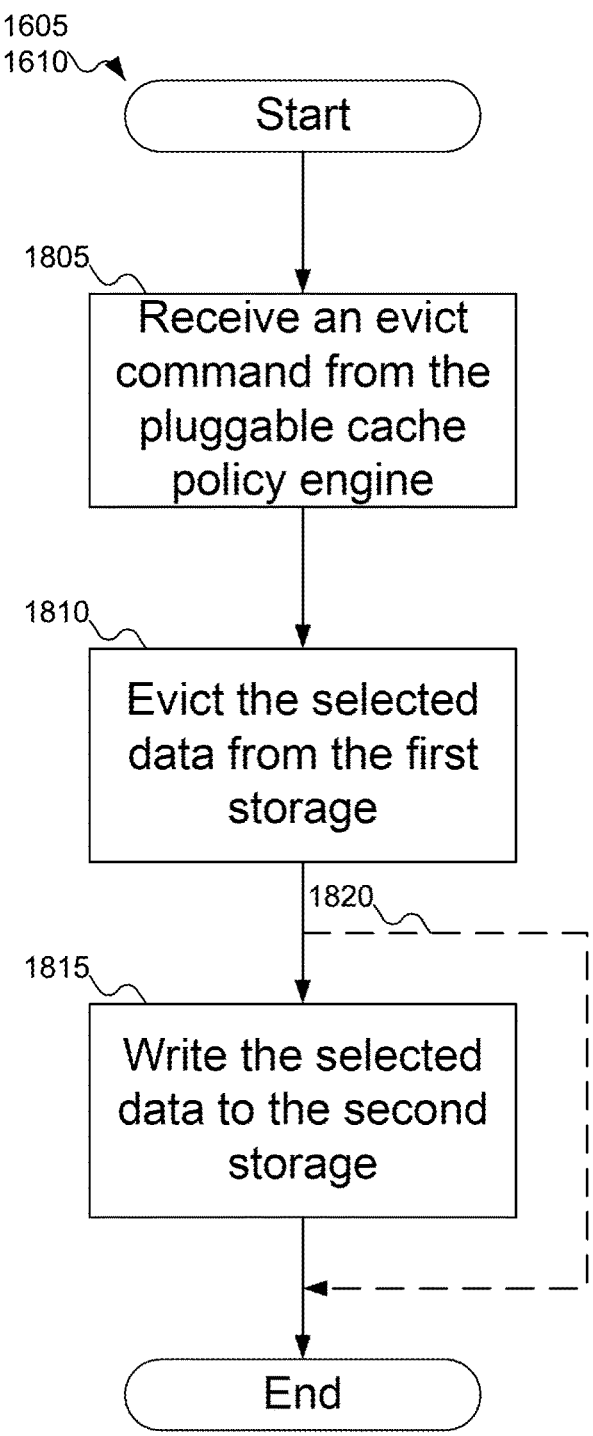
FIG. 18 shows a flowchart of an example procedure for the cache controller of FIG. 3 to process an evict command received from the pluggable cache policy engine of FIG. 3, according to embodiments of the disclosure.

FIG. 18 shows a flowchart of an example procedure for cache controller 315 of FIG. 3 to process evict command 610 of FIG. 6 received from pluggable cache policy engine 340 of FIG. 3, according to embodiments of the disclosure. In FIG. 18, at block 1805, cache controller 315 of FIG. 3 may receive evict command 610 of FIG. 6 from pluggable cache policy engine 340 of FIG. 3. At block 1810, cache controller 315 of FIG. 3 may evict the data from memory 320 of FIG. 3. This may involve writing the data selected for eviction back to storage device 325 of FIG. 3, as shown at block 1815, if the data selected for eviction was dirty (that is, not yet written to storage device 325 of FIG. 3); if the data did not need to be written back to storage device 325 of FIG. 3, then block 1815 may be omitted, as shown by dashed line 1820.

FIG. 19 shows a flowchart of an example procedure for cache controller 315 of FIG. 3 to process temperature command 615 of FIG. 6 received from pluggable cache policy engine 340 of FIG. 3, according to embodiments of the disclosure. In FIG. 19, at block 1905, cache controller 315 of FIG. 3 may receive temperature command 615 of FIG. 6 from pluggable cache policy engine 340 of FIG. 3. At block 1910, cache controller 315 of FIG. 3 may update temperature 525 of FIG. 5 in metadata 505 of FIG. 5 for the identified data.

Note that while FIGS. 17-18 do not show a block similar to block 1910, FIGS. 17-18 may also perform operations to update metadata 505 of FIG. 5. For example, when data is prefetched or evicted, entries 545 of FIG. 5 may be added or deleted to reflect the changes in the data being cached in memory 320 of FIG. 3. Thus, FIGS. 17-18 may also include blocks to update metadata 505 of FIG. 5 as appropriate, whether or not shown in FIGS. 17-18.

FIG. 20 shows a flowchart of an example procedure for cache controller 315 of FIG. 3 to process status command 620 of FIG. 6 received from pluggable cache policy engine 340 of FIG. 3, according to embodiments of the disclosure. In FIG. 20, at block 2005, cache controller 315 of FIG. 3 may receive status command 620 of FIG. 6 from pluggable cache policy engine 340 of FIG. 3. At block 2010, cache controller 315 of FIG. 3 may access entry 545 of FIG. 5 for the identified data from metadata 505 of FIG. 5. Finally, at block 2015, cache controller 315 of FIG. 3 may return the information from entry 545 of FIG. 5 to pluggable cache policy engine 340 of FIG. 3 in response 625 of FIG. 6.

In FIGS. 7-20, some embodiments of the disclosure are shown. But a person skilled in the art will recognize that other embodiments of the disclosure are also possible, by changing the order of the blocks, by omitting blocks, or by including links not shown in the drawings. All such variations of the flowcharts are considered to be embodiments of the disclosure, whether expressly described or not.

Some embodiments of the disclosure may include a memory device including a first storage and a second storage. A pluggable cache policy engine may instruct a cache controller regarding the storing of data in the first storage or the second storage. A pluggable cache policy engine may be aware of data access patterns by an application running on the host, and thus may better determine when to prefetch data into the first storage or to evict data from the first storage than a generic policy engine. The memory device may therefore offer a technical advantage in better management of data in the memory device, improving the average latency to access data from the memory device.

Some embodiments of the disclosure may use a storage device as a second storage of the memory device. The second storage may be accessed using a different protocol than the memory device. Embodiments of the disclosure may offer a technical advantage by enabling the use of storage devices that use different protocols as a back-end for the memory device, which may be accessed using a protocol not supported by the storage device.

Embodiments of the disclosure include a system and method for large memory expansion device using a cache-coherent interconnect interface, such as the Compute Express Link™ (CXL™) interface. (Compute Express Link and CXL are trademarks of the CXL Consortium in the United States.) The device may advertise a large memory capacity such as 16 gigabytes (GB), 64 GB, 128 GB, 256

GB, 512 GB, 1 terabyte (TB), 4 TB. 8 TB. 16 TB etc. However, this device may have a relatively small amount of Dynamic Random Access Memory (DRAM) that is used as device side cache in conjunction with NAND based large backup memory capacity. Embodiments of the disclosure may include a default device side cache controller to handle runtime Host memory accesses and a provision for pluggable cache policy engine attempting to predict future Host accesses.

Host memory accesses (Read/Write, also known as Load/Store) may be received over the cache-coherent interconnect interface at an End Point (EP). For a Host Read request, the default cache controller may fulfill the Host request from the DRAM attached to the FPGA if the requested data is present in the DRAM. If the requested data is not present in the DRAM, the default cache controller may fetch the data from the backend SSD.

For a Host Write request, the default cache controller may deposit the data in the DRAM attached to the FPGA if there is space available. If the DRAM space is not available, the default cache controller may flush some data to the backend SSD to make space available for the new Host data.

Thus, the default cache controller may handle present, or runtime Host accesses. The default cache controller may have a generic, abstract high level interface to attach third party, external device cache policy engine. Such a device cache policy engine may primarily attempt to predict future Host accesses, and thus attempts to achieve a high device side cache hit ratio.

The default cache controller may provide all the Host access information (Address, Read/Write, metadata) to the pluggable device cache policy engine. The pluggable device cache policy engine may use that information to predict future Host access patterns. The pluggable device cache policy engine may use those predictions to make sure that hot data is present in the device cache and thus achieve a high hit ratio. The pluggable device cache policy engine may also make sure that cold data is evicted to the backend SSD in advance to make room for new Host data.

The pluggable device cache policy engine may provide the commands to the default cache policy controller through a Command First In, First Out (FIFO) queue. The default cache controller may provide responses to the commands through a Response FIFO queue. The following commands may be used:
1. Prefetch The pluggable device cache policy engine may request a certain memory address page to be fetched into the device cache. The default cache controller provides may return a success/error status once the requested data is fetched.
2. Evict The pluggable device cache policy engine may request a certain memory address page to be evicted from the device cache. The default cache controller may return a success/error status once the requested data is evicted to the backend SSD.
3. Hot/Cold The pluggable device cache policy engine may report hotness or coldness of a certain memory address page. The default cache controller may use the hotness/coldness parameter to perform eviction candidate selection when device cache space is needed. The default cache controller may select less hot/colder pages for eviction.
4. Status The pluggable device cache policy engine may request the status of a certain memory address page from the default cache controller. The default cache controller may respond whether the page is in the device cache or not, hotness/coldness/access time/frequency information and other parameters.

Embodiments of the disclosure may include a memory device with a very large memory address range, a device side cache in DRAM, on-chip Static Random Access Memory (SRAM), fast NAND flash (such as single level cell (SLC) flash), or Magneto-resistive Random Access Memory (MRAM), among other possibilities), and full advertised memory capacity in NAND flash, a back-end full capacity, slower, low cost memory (such as triple level cell (TLC)/quad level cell (QLC) NAND flash).

The device cache may be hidden from the Host.

Embodiments of the disclosure may include a default cache controller and a mechanism to utilize a device cache policy engine. The device cache policy engine may be pluggable, and may be implemented in firmware and/or in hardware. The interface between the default cache controller and the device cache policy engine may be generic/abstract/high level.

The default cache controller may provide Host memory access information to the device cache policy engine through a FIFO queue. The device cache policy engine may issue commands, such as prefetch, evict, hot-cold, or status, to the default cache controller through a Command FIFO queue. The default cache controller may provide a response back to the device cache policy engine through a Response FIFO queue.

The available storage in the SSD and the device cache may be exposed to the Host via a cache-coherent interconnect-based .mem, .cache, and .io interface.

The device may use all or some of the device's local memory to cache some of the data residing in the SSD. Similarly, the cache metadata may be stored alongside the data on the device's local memory. Alternatively, the cache metadata may be stored in a dedicated memory.

The device may respond to memory requests received from the Host using the device's local memory or the back-end memory. The default cache controller may serve a Host Read request from the device cache if the data is present in the device cache. Otherwise, the requested data may be fetched from the back-end NAND memory and then served.

The default cache controller may serve a Host Write request to write to the device cache if space is available in the device cache. Otherwise, some existing data may be evicted to the backend SSD to make space available in the device cache.

All of the blocks or pages that cannot be found in the cache (i.e., cache hits) may also be stored in the back-end memory. But data that is stored in the cache may experience a lower latency than those requests that are served by the back-end memory.

The default cache controller may support one or more replacement policies, such as Least Recently Used (LRU) and First-in-First-out (FIFO) policies. Similarly, the cache may use different writing policies, including write-through and write-back policies.

The device may include a default cache controller that manages the device cache. The default cache controller has two main tasks. One task is to manage the cache, including updating the cache metadata, finding empty blocks to write new data blocks in the cache, and evicting the blocks from the cache. The default cache controller's second task is communicating with the device cache policy engine. This task may include receiving commands from the cache policy engine and sending responses back. The device cache controller may also send Host transaction information to the device cache policy engine.

The device cache policy engine commands and parameters may be used to influence data eviction decisions by the default cache controller. A hot/cold command may include a parameter to indicate a hotness value to use with a memory address page. This hotness value may be any value in a desired range. For example, the range may span from 0 to 256, with 0 being the coldest value, 256 being the hottest value, and intermediate values indicating a relative hotness of the data.

The device cache policy engine may be integrated into the device, or it may be an independent element outside the device that may communicate with the device using an external interface. The device cache policy engine may be a hardware engine or a software implementation running on hardware. The device cache policy engine may detect the temporal and spatial locality of memory accesses. The default cache controller in the device may provide the memory address traces to the device cache policy engine. The device cache policy engine may collect that information and may provide insight into future Host accesses to the cache engine.

The device cache policy engine may send at least three policy decisions to the default cache controller. (1) The device cache policy engine may determine a block's hotness (the hotter a block is, the more frequently the block is going to be accessed in the future); (2) The device cache policy engine may send eviction commands, which may free space for new incoming blocks; (3) The device cache policy engine may send prefetching commands to bring certain blocks into the cache before the Host accesses them. This latter policy decision may be based on the device cache policy engine predicting that those blocks may be accessed by the Host in the near future.

The device cache policy engine may send policy information to the default cache controller commands. The commands may include an opcode, an address, and instruction-specific information. The default cache controller may decode the commands and perform the proper actions accordingly.

The default cache controller may store some extra information in addition to its regular cache metadata, which may be updated by commands received from the cache policy engine. This extra policy metadata may override the default metadata cache information, such as the LRU counters. The default cache controller may accommodate device cache policy engine requests on a best-effort basis. If the default cache controller may not fulfill the cache policy engine recommendations, the default cache controller may drop the requests and may notify the cache engine accordingly.

The following discussion is intended to provide a brief, general description of a suitable machine or machines in which certain aspects of the disclosure may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present disclosure may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the disclosure may include a tangible, non-transitory machine-readable medium comprising instructions executable by one or more processors, the instructions comprising instructions to perform the elements of the disclosures as described herein.

The various operations of methods described above may be performed by any suitable means capable of performing the operations, such as various hardware and/or software component(s), circuits, and/or module(s). The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Having described and illustrated the principles of the disclosure with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the disclosure" or the like are used herein, these phrases are meant to generally reference embodiment possibilities, and are not intended to limit the disclosure to particular embodiment configurations. As used herein, these terms may reference the same or different embodiments that are combinable into other embodiments.

The foregoing illustrative embodiments are not to be construed as limiting the disclosure thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this disclosure as defined in the claims.

Embodiments of the disclosure may extend to the following statements, without limitation:

Statement 1. An embodiment of the disclosure includes a memory device, comprising: an interface to connect the memory device to a processor;
 a first storage for a data;
 a second storage for the data;
 a controller to process a request received from the processor via the interface using the first storage or the second storage; and
 a policy engine to instruct the controller regarding a storing of the data in the first storage or the second storage.

Statement 2. An embodiment of the disclosure includes the memory device according to statement 1, wherein the memory device supports a cache-coherent interconnect protocol.

Statement 3. An embodiment of the disclosure includes the memory device according to statement 2, wherein the cache-coherent interconnect protocol includes a Compute Express Link (CXL) protocol.

Statement 4. An embodiment of the disclosure includes the memory device according to statement 2, wherein the second storage supports a second protocol.

Statement 5. An embodiment of the disclosure includes the memory device according to statement 4, wherein the second protocol is different from the cache-coherent interconnect protocol.

Statement 6. An embodiment of the disclosure includes the memory device according to statement 4, further comprising an interface to the second storage, the interface supporting the second protocol.

Statement 7. An embodiment of the disclosure includes the memory device according to statement 1, further comprising an interface to the first storage.

Statement 8. An embodiment of the disclosure includes the memory device according to statement 7, wherein the interface includes a memory controller.

Statement 9. An embodiment of the disclosure includes the memory device according to statement 1, wherein:
 the first storage includes a first latency;
 the second storage includes a second latency; and
 the first latency is lower than the second latency.

Statement 10. An embodiment of the disclosure includes the memory device according to statement 1, wherein the first storage includes Dynamic Random Access Memory (DRAM), Static Random Access Memory (SRAM), fast NAND flash memory, or Magneto-resistive Random Access Memory (MRAM).

Statement 11. An embodiment of the disclosure includes the memory device according to statement 1, wherein the second storage includes a slow NAND flash memory or a hard disk drive.

Statement 12. An embodiment of the disclosure includes the memory device according to statement 1, wherein the memory device is exposed to the processor as an extension of a memory associated with the processor.

Statement 13. An embodiment of the disclosure includes the memory device according to statement 12, further comprising an endpoint to expose the memory device to the processor as an extension of the memory associated with the processor.

Statement 14. An embodiment of the disclosure includes the memory device according to statement 13, wherein the endpoint supports a cache-coherent interconnect protocol.

Statement 15. An embodiment of the disclosure includes the memory device according to statement 1, wherein:
 the request includes a read request for the data;
 the first storage stores the data; and
 the controller is configured return the data to the processor from the first storage.

Statement 16. An embodiment of the disclosure includes the memory device according to statement 15, wherein the controller is configured to copy the data from the second storage to the first storage based at least in part on the first storage not storing the data.

Statement 17. An embodiment of the disclosure includes the memory device according to statement 16, wherein the controller is further configured to evict a second data from the first storage based at least in part on the first storage being full.

Statement 18. An embodiment of the disclosure includes the memory device according to statement 17, wherein the controller is further configured to select the second data for eviction from the first storage based at least in part on a temperature associated with the second data.

Statement 19. An embodiment of the disclosure includes the memory device according to statement 1, wherein:
 the request includes a write request for a second data; and
 the controller is configured to write the second data to the first storage.

Statement 20. An embodiment of the disclosure includes the memory device according to statement 19, wherein the controller is configured to evict the data from the first storage to make room for the second data.

Statement 21. An embodiment of the disclosure includes the memory device according to statement 20, wherein the controller is configured to select the data for eviction from the first storage based at least in part on a temperature associated with the data.

Statement 22. An embodiment of the disclosure includes the memory device according to statement 20, wherein the controller is further configured to write the data to the second storage.

Statement 23. An embodiment of the disclosure includes the memory device according to statement 1, including a metadata for the data in the first memory device.

Statement 24. An embodiment of the disclosure includes the method according to statement 23, wherein the metadata includes an address for the data in the first storage, a size of the data in the first storage, a clean/dirty status for the data in the first storage, a temperature of the data in the first storage, a last access for the data in the first storage, an access count for the data in the first storage, or an access frequency for the data in the first storage.

Statement 25. An embodiment of the disclosure includes the memory device according to statement 23, wherein the controller is configured to update the metadata based at least in part on the request received from the processor.

Statement 26. An embodiment of the disclosure includes the memory device according to statement 1, further comprising:
a command queue for the policy engine to send a command to the controller; and
a response queue for the policy engine to receive a response to the command from the controller.

Statement 27. An embodiment of the disclosure includes the memory device according to statement 26, wherein:
the command includes a first priority;
the memory device further comprises a second command queue for the policy engine to send a second command to the controller, the second command including a second priority; and
the first priority is different from the second priority.

Statement 28. An embodiment of the disclosure includes the memory device according to statement 27, further comprising a second response queue for the policy engine to receive a second response to the second command from the controller.

Statement 29. An embodiment of the disclosure includes the memory device according to statement 1, further comprising a queue for the controller to inform the policy engine regarding the data stored in the first storage.

Statement 30. An embodiment of the disclosure includes the memory device according to statement 29, wherein the controller is configured to send information about the request from the processor to the policy engine using the queue.

Statement 31. An embodiment of the disclosure includes the memory device according to statement 30, wherein the information about the request from the policy engine includes an address for the data in the first storage, a size of the data in the first storage, a clean/dirty status for the data in the first storage, a temperature of the data in the first storage, a last access for the data in the first storage, an access count for the data in the first storage, an access frequency for the data in the first storage, or a host-supplied metadata associated with the data in the first storage.

Statement 32. An embodiment of the disclosure includes the memory device according to statement 31, wherein the host-supplied metadata associated with the data in the first storage includes a hint regarding a second data associated with a second request from the host.

Statement 33. An embodiment of the disclosure includes the memory device according to statement 30, wherein the policy engine includes a third storage for the information about the request from the processor.

Statement 34. An embodiment of the disclosure includes the memory device according to statement 30, wherein the first storage includes a portion for the policy engine to store the information about the request from the processor.

Statement 35. An embodiment of the disclosure includes the memory device according to statement 34, wherein the portion of the first storage is reserved for use by the policy engine.

Statement 36. An embodiment of the disclosure includes the memory device according to statement 30, wherein the second storage includes a portion for the policy engine to store the information about the request from the processor.

Statement 37. An embodiment of the disclosure includes the memory device according to statement 36, wherein the portion of the second storage is reserved for use by the policy engine.

Statement 38. An embodiment of the disclosure includes the memory device according to statement 1, wherein the policy engine is configured to instruct the controller regarding the storing of the data in the first storage and the second storage based at least in part on an application using the data.

Statement 39. An embodiment of the disclosure includes the memory device according to statement 1, wherein the policy engine is configured to send a prefetch command to the controller to prefetch the data from the second storage into the first storage.

Statement 40. An embodiment of the disclosure includes the memory device according to statement 39, wherein the policy engine includes a prefetch engine to select the data in the second storage to prefetch into the first storage.

Statement 41. An embodiment of the disclosure includes the memory device according to statement 39, wherein the controller is configured to copy the data from the second storage to the first storage.

Statement 42. An embodiment of the disclosure includes the memory device according to statement 41, wherein the controller is further configured to evict a second data from the first storage based at least in part on the first storage being full.

Statement 43. An embodiment of the disclosure includes the memory device according to statement 42, wherein the controller is further configured to select the second data for eviction from the first storage based at least in part on a temperature associated with the second data.

Statement 44. An embodiment of the disclosure includes the memory device according to statement 1, wherein the policy engine is configured to send an evict command to the controller to evict the data from the first storage.

Statement 45. An embodiment of the disclosure includes the memory device according to statement 44, wherein the policy engine includes an evict engine to select the data for eviction from the first storage.

Statement 46. An embodiment of the disclosure includes the memory device according to statement 44, wherein the controller is configured to evict the data from the first storage.

Statement 47. An embodiment of the disclosure includes the memory device according to statement 46, wherein the controller is further configured to copy the data from the first storage to the second storage.

Statement 48. An embodiment of the disclosure includes the memory device according to statement 1, wherein the policy engine is configured to send a temperature command to the controller to set a temperature for the data in the first storage.

Statement 49. An embodiment of the disclosure includes the memory device according to statement 48, wherein the policy engine includes a temperature engine to select the data in the first storage and the temperature for the data in the first storage.

Statement 50. An embodiment of the disclosure includes the memory device according to statement 48, wherein the controller is configured to update a metadata to store the temperature for the data in the first storage.

Statement 51. An embodiment of the disclosure includes the memory device according to statement 1, wherein the policy engine is configured to send a status command to the controller regarding the data in the first storage.

Statement 52. An embodiment of the disclosure includes the memory device according to statement 51, wherein the policy engine includes a status engine to select the data in the first storage for which the status command is to be sent.

Statement 53. An embodiment of the disclosure includes the memory device according to statement 51, wherein the controller is configured to return a status of the data in the first storage.

Statement 54. An embodiment of the disclosure includes the memory device according to statement 53, wherein the status includes a presence of the data in the first storage, an absence of the data in the first storage, an address for the data in the first storage, a size of the data in the first storage, a clean/dirty status for the data in the first storage, a temperature of the data in the first storage, or an access information associated with the data in the first storage.

Statement 55. An embodiment of the disclosure includes the memory device according to statement 54, wherein the access information associated with the data in the first storage includes a last access for the data in the first storage, an access count for the data in the first storage, or an access frequency for the data in the first storage.

Statement 56. An embodiment of the disclosure includes the memory device according to statement 1, wherein the policy engine is pluggable.

Statement 57. An embodiment of the disclosure includes the memory device according to statement 56, further comprising a connector configured to receive a device including the policy engine.

Statement 58. An embodiment of the disclosure includes the memory device according to statement 56, wherein:
the policy engine includes a second processor and software running on the second processor; and
the memory device is configured to support update of the software running on the second processor.

Statement 59. An embodiment of the disclosure includes the memory device according to statement 1, wherein:
the policy engine is separate from the memory device;
the memory device includes a second interface; and
the policy engine connects with the memory device via the second interface.

Statement 60. An embodiment of the disclosure includes the memory device according to statement 1, wherein:
the policy engine is separate from the memory device;
the policy engine communicates with the memory device via the interface.

Statement 61. An embodiment of the disclosure includes the memory device according to statement 60, wherein the policy engine communicates with the memory device using a cache-coherent interconnect protocol.

Statement 62. An embodiment of the disclosure includes a method, comprising:
sending a command from a policy engine to a controller in a memory device, the command relating to storing a data in a first storage of the memory device or a second storage of the memory device; and
receiving a response at the policy engine from the controller in the memory device, the response based at least in part on the command,
wherein the policy engine is pluggable.

Statement 63. An embodiment of the disclosure includes the method according to statement 62, wherein the memory device includes the policy engine.

Statement 64. An embodiment of the disclosure includes the method according to statement 62, wherein the memory device includes an interface to communicate with the policy engine.

Statement 65. An embodiment of the disclosure includes the method according to statement 64, wherein the memory device is configured to communicate with a processor via the interface.

Statement 66. An embodiment of the disclosure includes the method according to statement 62, wherein the memory device includes a connector configured to receive a device that includes the policy engine.

Statement 67. An embodiment of the disclosure includes the method according to statement 62, wherein:
the policy engine includes a processor and software running on the processor; and
the memory device is configured to support update of the software running on the processor.

Statement 68. An embodiment of the disclosure includes the method according to statement 62, wherein:
sending the command from the policy engine to the controller in the memory device includes sending the command from the policy engine to the controller in the memory device via a command queue; and
receiving the response at the policy engine from the controller in the memory device includes receiving the response at the policy engine from the controller in the memory device via a response queue.

Statement 69. An embodiment of the disclosure includes the method according to statement 68, wherein:
sending the command from the policy engine to the controller in the memory device via the command queue includes sending the command from the policy engine to the controller in the memory device via a command First In, First Out (FIFO) queue; and
receiving the response at the policy engine from the controller in the memory device via the response queue includes receiving the response at the policy engine from the controller in the memory device via a response FIFO queue.

Statement 70. An embodiment of the disclosure includes the method according to statement 62, wherein sending the command from the policy engine to the controller in the memory device includes sending a prefetch command for the data in the second storage of the memory device from a prefetch engine to the controller in the memory device.

Statement 71. An embodiment of the disclosure includes the method according to statement 70, wherein sending the prefetch command for the data in the second storage of the memory device from the prefetch engine to the controller in the memory device includes selecting the data in the second storage of the memory device for prefetch by the policy engine.

Statement 72. An embodiment of the disclosure includes the method according to statement 71, wherein selecting the data in the second storage of the memory device for prefetch by the policy engine includes selecting the data in the second storage of the memory device for prefetch by a prefetch engine in the policy engine.

Statement 73. An embodiment of the disclosure includes the method according to statement 62, wherein sending the command from the policy engine to the controller in the memory device includes sending an evict command for the data in the first storage of the memory device from a prefetch engine to the controller in the memory device.

Statement 74. An embodiment of the disclosure includes the method according to statement 73, wherein sending the evict command for the data in the first storage of the memory device from the prefetch engine to the controller in the memory device includes selecting the data in the first storage of the memory device for eviction by the policy engine.

Statement 75. An embodiment of the disclosure includes the method according to statement 74, wherein selecting the data in the first storage of the memory device for eviction by the policy engine includes selecting the data in the first storage of the memory device for eviction by an evict engine in the policy engine.

Statement 76. An embodiment of the disclosure includes the method according to statement 62, wherein sending the command from the policy engine to the controller in the memory device includes sending a temperature command for the data from a prefetch engine to the controller in the memory device.

Statement 77. An embodiment of the disclosure includes the method according to statement 76, wherein sending the temperature command for the data from the prefetch engine to the controller in the memory device includes:
  selecting a data in the first storage of the memory device; and
  determining a temperature for the data in the first storage of the memory device by the policy engine.

Statement 78. An embodiment of the disclosure includes the method according to statement 77, wherein:
  selecting a data in the first storage of the memory device includes selecting a data in the first storage of the memory device by a temperature engine; and
  determining a temperature for the data in the first storage of the memory device by the policy engine includes determining a temperature for the data in the first storage of the memory device by the policy engine by the temperature engine.

Statement 79. An embodiment of the disclosure includes the method according to statement 62, wherein sending the command from the policy engine to the controller in the memory device includes sending a status command from the policy engine to the controller in the memory device.

Statement 80. An embodiment of the disclosure includes the method according to statement 79, wherein sending a status command from the policy engine to the controller in the memory device includes selecting a data in the first storage of the memory device.

Statement 81. An embodiment of the disclosure includes the method according to statement 80, wherein selecting a data in the first storage of the memory device includes selecting a data in the first storage of the memory device by a status engine.

Statement 82. An embodiment of the disclosure includes the method according to statement 79, wherein receiving the response at the policy engine from the controller in the memory device includes receiving a status at the policy engine from the controller in the memory device for the data in the first storage of the memory device.

Statement 83. An embodiment of the disclosure includes the method according to statement 82, wherein the status includes a presence of the data in the first storage, an absence of the data in the first storage, an address for the data in the first storage, a size of the data in the first storage, a clean/dirty status for the data in the first storage, a temperature of the data in the first storage, or an access information associated with the data in the first storage.

Statement 84. An embodiment of the disclosure includes the method according to statement 83, wherein the access information associated with the data in the first storage includes a last access for the data in the first storage, an access count for the data in the first storage, or an access frequency for the data in the first storage.

Statement 85. An embodiment of the disclosure includes the method according to statement 62, further comprising receiving, from the controller in the memory device, information about a request received by the controller in the memory device from a processor.

Statement 86. An embodiment of the disclosure includes the method according to statement 85, wherein the information about the request includes an address for the data in the first storage, a size of the data in the first storage, a clean/dirty status for the data in the first storage, a temperature of the data in the first storage, a last access for the data in the first storage, an access count for the data in the first storage, an access frequency for the data in the first storage, or a host-supplied metadata associated with the data in the first storage.

Statement 87. An embodiment of the disclosure includes the method according to statement 86, wherein the host-supplied metadata associated with the data in the first storage includes a hint about a second data associated with a second request from the host.

Statement 88. An embodiment of the disclosure includes the method according to statement 85, further comprising storing the information about the request.

Statement 89. An embodiment of the disclosure includes the method according to statement 88, wherein storing the information about the request includes storing the information about the request in a third storage of the policy engine.

Statement 90. An embodiment of the disclosure includes the method according to statement 88, wherein storing the information about the request includes storing the information about the request in a portion of the first storage of the memory device.

Statement 91. An embodiment of the disclosure includes the method according to statement 88, wherein storing the information about the request includes storing the information about the request in a portion of the second storage of the memory device.

Statement 92. An embodiment of the disclosure includes the method according to statement 85, wherein sending the command from the policy engine to the controller in the memory device includes sending the command from the policy engine to the controller in the memory device based at least in part on the information about the request received from the processor.

Statement 93. An embodiment of the disclosure includes the method according to statement 85, wherein receiving the information from the controller in the memory device about the request received from the processor includes receiving the information from the controller in the memory device about the request received from the processor via a queue.

Statement 94. An embodiment of the disclosure includes the method according to statement 93, wherein receiving the information from the controller in the memory device about the request received from the processor via the queue includes receiving the information from the controller in the memory device about the request received from the processor via a FIFO queue.

Statement 95. An embodiment of the disclosure includes a method, comprising:
  receiving a request from a processor at a controller of a memory device;
  processing the request using a first storage of the memory device or a second storage of the device; and
  sending information about the request to a policy engine, wherein the policy engine is pluggable.

Statement 96. An embodiment of the disclosure includes the method according to statement 95, wherein the memory device includes the policy engine.

Statement 97. An embodiment of the disclosure includes the method according to statement 95, wherein the memory device includes an interface to communicate with the policy engine.

Statement 98. An embodiment of the disclosure includes the method according to statement 97, wherein the memory device is configured to communicate with the processor via the interface.

Statement 99. An embodiment of the disclosure includes the method according to statement 95, wherein the memory device includes a connector configured to receive a device that includes the policy engine.

Statement 100. An embodiment of the disclosure includes the method according to statement 95, wherein:
the policy engine includes a second processor and software running on the second processor; and
the memory device is configured to support update of the software running on the second processor.

Statement 101. An embodiment of the disclosure includes the method according to statement 95, wherein the information about the request includes an address for the data in the first storage, a size of the data in the first storage, a clean/dirty status for the data in the first storage, a temperature of the data in the first storage, a last access for the data in the first storage, an access count for the data in the first storage, an access frequency for the data in the first storage, or a host-supplied metadata associated with the data in the first storage.

Statement 102. An embodiment of the disclosure includes the method according to statement 101, wherein the host-supplied metadata associated with the data in the first storage includes a hint regarding a second data associated with a second request from the host.

Statement 103. An embodiment of the disclosure includes the method according to statement 95, wherein sending the information about the request to the policy engine includes sending the information about the request to the policy engine via a First In, First Out (FIFO) queue.

Statement 104. An embodiment of the disclosure includes the method according to statement 95, further comprising updating a metadata for the data in the first memory device by the controller.

Statement 105. An embodiment of the disclosure includes the method according to statement 104, wherein updating the metadata for the data in the first memory device by the controller includes updating the metadata for the data in the first memory device by the controller based at least in part on the request received from the processor.

Statement 106. An embodiment of the disclosure includes the method according to statement 104, wherein updating the metadata for the data in the first memory device by the controller includes updating an address for the data in the first storage, a size of the data in the first storage, a clean/dirty status for the data in the first storage, a temperature of the data in the first storage, or an access information associated with the data in the first storage by the controller.

Statement 107. An embodiment of the disclosure includes the method according to statement 95, further comprising:
receiving a command from the policy engine at the controller of the memory device, the command relating to storing a data in the first storage of the memory device or the second storage of the memory device; and
processing the command by the controller of the memory device using the first storage of the memory device or the second storage of the memory device.

Statement 108. An embodiment of the disclosure includes the method according to statement 107, wherein receiving the command from the policy engine at the controller of the memory device includes receiving the command from the policy engine at the controller of the memory device via a command queue.

Statement 109. An embodiment of the disclosure includes the method according to statement 108, wherein receiving the command from the policy engine at the controller of the memory device via the command queue includes receiving the command from the policy engine at the controller of the memory device via a command FIFO queue.

Statement 110. An embodiment of the disclosure includes the method according to statement 107, further comprising sending a response from the controller of the memory device to the policy engine, the response based at least in part on the command.

Statement 111. An embodiment of the disclosure includes the method according to statement 110, wherein sending the response from the controller of the memory device to the policy engine includes sending the response from the controller of the memory device to the policy engine via a response queue.

Statement 112. An embodiment of the disclosure includes the method according to statement 111, wherein sending the response from the controller of the memory device to the policy engine via the response queue includes sending the response from the controller of the memory device to the policy engine via a response FIFO queue.

Statement 113. An embodiment of the disclosure includes the method according to statement 107, wherein:
receiving the command from the policy engine at the controller of the memory device includes receiving a prefetch command for a data from the policy engine at the controller of the memory device; and
processing the command by the controller of the memory device using the first storage of the memory device or the second storage of the memory device includes prefetching the data from the second storage of the memory device into the first storage of the memory device.

Statement 114. An embodiment of the disclosure includes the method according to statement 113, wherein prefetching data from the second storage of the memory device into the first storage of the memory device includes:
selecting a second data in the first storage of the memory device for eviction; and
evicting the second data from the first storage of the memory device.

Statement 115. An embodiment of the disclosure includes the method according to statement 114, wherein selecting the second data in the first storage of the memory device for eviction includes selecting the second data in the first storage of the memory device for eviction based at least in part on a temperature of the second data in the first storage of the memory device.

Statement 116. An embodiment of the disclosure includes the method according to statement 114, wherein evicting the second data from the first storage of the memory device includes writing the second data into the second storage of the memory device.

Statement 117. An embodiment of the disclosure includes the method according to statement 107, wherein:
receiving the command from the policy engine at the controller of the memory device includes receiving an evict command for a data from the policy engine at the controller of the memory device; and
processing the command by the controller of the memory device using the first storage of the memory device or the second storage of the memory device includes evicting the data from the first storage of the memory device.

Statement 118. An embodiment of the disclosure includes the method according to statement 117, wherein evicting the data from the first storage of the memory device includes writing the data into the second storage of the memory device.

Statement 119. An embodiment of the disclosure includes the method according to statement 107, wherein:
receiving the command from the policy engine at the controller of the memory device includes receiving a temperature command for a data from the policy engine at the controller of the memory device, the temperature command including a temperature for the data; and
processing the command by the controller of the memory device using the first storage of the memory device or the second storage of the memory device includes updating a metadata for the data in the first storage of the memory device by the controller to store the temperature for the data.

Statement 120. An embodiment of the disclosure includes the method according to statement 107, wherein:
receiving the command from the policy engine at the controller of the memory device includes receiving a status command for a data from the policy engine at the controller of the memory device; and
processing the command by the controller of the memory device using the first storage of the memory device or the second storage of the memory device includes returning a status of the data in the first storage.

Statement 121. An embodiment of the disclosure includes the method according to statement 120, wherein returning the status of the data in the first storage includes returning the status of the data in the first storage based at least in part on a metadata for the data in the first storage of the memory device.

Statement 122. An embodiment of the disclosure includes the method according to statement 120, wherein the status includes a presence of the data in the first storage, an absence of the data in the first storage, an address for the data in the first storage, a size of the data in the first storage, a clean/dirty status for the data in the first storage, a temperature of the data in the first storage, or an access information associated with the data in the first storage.

Statement 123. An embodiment of the disclosure includes an article, comprising a non-transitory storage medium, the non-transitory storage medium having stored thereon instructions that, when executed by a machine, result in:
sending a command from a policy engine to a controller in a memory device, the command relating to storing a data in a first storage of the memory device or a second storage of the memory device; and
receiving a response at the policy engine from the controller in the memory device, the response based at least in part on the command,
wherein the policy engine is pluggable.

Statement 124. An embodiment of the disclosure includes the article according to statement 123, wherein the memory device includes the policy engine.

Statement 125. An embodiment of the disclosure includes the article according to statement 123, wherein the memory device includes an interface to communicate with the policy engine.

Statement 126. An embodiment of the disclosure includes the article according to statement 125, wherein the memory device is configured to communicate with a processor via the interface.

Statement 127. An embodiment of the disclosure includes the article according to statement 123, wherein the memory device includes a connector configured to receive a device that includes the policy engine.

Statement 128. An embodiment of the disclosure includes the article according to statement 123, wherein:
the policy engine includes a processor and software running on the processor; and
the memory device is configured to support update of the software running on the processor.

Statement 129. An embodiment of the disclosure includes the article according to statement 123, wherein:
sending the command from the policy engine to the controller in the memory device includes sending the command from the policy engine to the controller in the memory device via a command queue; and
receiving the response at the policy engine from the controller in the memory device includes receiving the response at the policy engine from the controller in the memory device via a response queue.

Statement 130. An embodiment of the disclosure includes the article according to statement 129, wherein:
sending the command from the policy engine to the controller in the memory device via the command queue includes sending the command from the policy engine to the controller in the memory device via a command First In, First Out (FIFO) queue; and
receiving the response at the policy engine from the controller in the memory device via the response queue includes receiving the response at the policy engine from the controller in the memory device via a response FIFO queue.

Statement 131. An embodiment of the disclosure includes the article according to statement 123, wherein sending the command from the policy engine to the controller in the memory device includes sending a prefetch command for the data in the second storage of the memory device from a prefetch engine to the controller in the memory device.

Statement 132. An embodiment of the disclosure includes the article according to statement 131, wherein sending the prefetch command for the data in the second storage of the memory device from the prefetch engine to the controller in the memory device includes selecting the data in the second storage of the memory device for prefetch by the policy engine.

Statement 133. An embodiment of the disclosure includes the article according to statement 132, wherein selecting the data in the second storage of the memory device for prefetch by the policy engine includes selecting the data in the second storage of the memory device for prefetch by a prefetch engine in the policy engine.

Statement 134. An embodiment of the disclosure includes the article according to statement 123, wherein sending the command from the policy engine to the controller in the memory device includes sending an evict command for the data in the first storage of the memory device from a prefetch engine to the controller in the memory device.

Statement 135. An embodiment of the disclosure includes the article according to statement 134, wherein sending the evict command for the data in the first storage of the memory device from the prefetch engine to the controller in the memory device includes selecting the data in the first storage of the memory device for eviction by the policy engine.

Statement 136. An embodiment of the disclosure includes the article according to statement 135, wherein selecting the data in the first storage of the memory device for eviction by the policy engine includes selecting the data in the first storage of the memory device for eviction by an evict engine in the policy engine.

Statement 137. An embodiment of the disclosure includes the article according to statement 123, wherein sending the command from the policy engine to the controller in the memory device includes sending a temperature command for the data from a prefetch engine to the controller in the memory device.

Statement 138. An embodiment of the disclosure includes the article according to statement 137, wherein sending the temperature command for the data from the prefetch engine to the controller in the memory device includes:
  selecting a data in the first storage of the memory device; and
  determining a temperature for the data in the first storage of the memory device by the policy engine.

Statement 139. An embodiment of the disclosure includes the article according to statement 138, wherein:
  selecting a data in the first storage of the memory device includes selecting a data in the first storage of the memory device by a temperature engine; and
  determining a temperature for the data in the first storage of the memory device by the policy engine includes determining a temperature for the data in the first storage of the memory device by the policy engine by the temperature engine.

Statement 140. An embodiment of the disclosure includes the article according to statement 123, wherein sending the command from the policy engine to the controller in the memory device includes sending a status command from the policy engine to the controller in the memory device.

Statement 141. An embodiment of the disclosure includes the article according to statement 140, wherein sending a status command from the policy engine to the controller in the memory device includes selecting a data in the first storage of the memory device.

Statement 142. An embodiment of the disclosure includes the article according to statement 141, wherein selecting a data in the first storage of the memory device includes selecting a data in the first storage of the memory device by a status engine.

Statement 143. An embodiment of the disclosure includes the article according to statement 140, wherein receiving the response at the policy engine from the controller in the memory device includes receiving a status at the policy engine from the controller in the memory device for the data in the first storage of the memory device.

Statement 144. An embodiment of the disclosure includes the article according to statement 143, wherein the status includes a presence of the data in the first storage, an absence of the data in the first storage, an address for the data in the first storage, a size of the data in the first storage, a clean/dirty status for the data in the first storage, a temperature of the data in the first storage, or an access information associated with the data in the first storage.

Statement 145. An embodiment of the disclosure includes the article according to statement 144, wherein the access information associated with the data in the first storage includes a last access for the data in the first storage, an access count for the data in the first storage, or an access frequency for the data in the first storage.

Statement 146. An embodiment of the disclosure includes the article according to statement 123, the non-transitory storage medium having stored thereon further instructions that, when executed by the machine, result in receiving, from the controller in the memory device, information about a request received by the controller in the memory device from a processor.

Statement 147. An embodiment of the disclosure includes the article according to statement 146, wherein the information about the request includes an address for the data in the first storage, a size of the data in the first storage, a clean/dirty status for the data in the first storage, a temperature of the data in the first storage, a last access for the data in the first storage, an access count for the data in the first storage, an access frequency for the data in the first storage, or a host-supplied metadata associated with the data in the first storage.

Statement 148. An embodiment of the disclosure includes the article according to statement 147, wherein the host-supplied metadata associated with the data in the first storage includes a hint about a second data associated with a second request from the host.

Statement 149. An embodiment of the disclosure includes the article according to statement 146, the non-transitory storage medium having stored thereon further instructions that, when executed by the machine, result in storing the information about the request.

Statement 150. An embodiment of the disclosure includes the article according to statement 149, wherein storing the information about the request includes storing the information about the request in a third storage of the policy engine.

Statement 151. An embodiment of the disclosure includes the article according to statement 149, wherein storing the information about the request includes storing the information about the request in a portion of the first storage of the memory device.

Statement 152. An embodiment of the disclosure includes the article according to statement 149, wherein storing the information about the request includes storing the information about the request in a portion of the second storage of the memory device.

Statement 153. An embodiment of the disclosure includes the article according to statement 146, wherein sending the command from the policy engine to the controller in the memory device includes sending the command from the policy engine to the controller in the memory device based at least in part on the information about the request received from the processor.

Statement 154. An embodiment of the disclosure includes the article according to statement 146, wherein receiving the information from the controller in the memory device about the request received from the processor includes receiving the information from the controller in the memory device about the request received from the processor via a queue.

Statement 155. An embodiment of the disclosure includes the article according to statement 154, wherein receiving the information from the controller in the memory device about the request received from the processor via the queue includes receiving the information from the controller in the memory device about the request received from the processor via a FIFO queue.

Statement 156. An embodiment of the disclosure includes an article, comprising a non-transitory storage medium, the non-transitory storage medium having stored thereon instructions that, when executed by a machine, result in:
  receiving a request from a processor at a controller of a memory device;
  processing the request using a first storage of the memory device or a second storage of the device; and sending information about the request to a policy engine, wherein the policy engine is pluggable.

Statement 157. An embodiment of the disclosure includes the article according to statement 156, wherein the memory device includes the policy engine.

Statement 158. An embodiment of the disclosure includes the article according to statement 156, wherein the memory device includes an interface to communicate with the policy engine.

Statement 159. An embodiment of the disclosure includes the article according to statement 158, wherein the memory device is configured to communicate with the processor via the interface.

Statement 160. An embodiment of the disclosure includes the article according to statement 156, wherein the memory device includes a connector configured to receive a device that includes the policy engine.

Statement 161. An embodiment of the disclosure includes the article according to statement 156, wherein:
 the policy engine includes a second processor and software running on the second processor; and
 the memory device is configured to support update of the software running on the second processor.

Statement 162. An embodiment of the disclosure includes the article according to statement 156, wherein the information about the request includes an address for the data in the first storage, a size of the data in the first storage, a clean/dirty status for the data in the first storage, a temperature of the data in the first storage, a last access for the data in the first storage, an access count for the data in the first storage, an access frequency for the data in the first storage, or a host-supplied metadata associated with the data in the first storage.

Statement 163. An embodiment of the disclosure includes the article according to statement 162, wherein the host-supplied metadata associated with the data in the first storage includes a hint regarding a second data associated with a second request from the host.

Statement 164. An embodiment of the disclosure includes the article according to statement 156, wherein sending the information about the request to the policy engine includes sending the information about the request to the policy engine via a First In, First Out (FIFO) queue.

Statement 165. An embodiment of the disclosure includes the article according to statement 156, the non-transitory storage medium having stored thereon further instructions that, when executed by the machine, result in updating a metadata for the data in the first memory device by the controller.

Statement 166. An embodiment of the disclosure includes the article according to statement 165, wherein updating the metadata for the data in the first memory device by the controller includes updating the metadata for the data in the first memory device by the controller based at least in part on the request received from the processor.

Statement 167. An embodiment of the disclosure includes the article according to statement 165, wherein updating the metadata for the data in the first memory device by the controller includes updating an address for the data in the first storage, a size of the data in the first storage, a clean/dirty status for the data in the first storage, a temperature of the data in the first storage, or an access information associated with the data in the first storage by the controller.

Statement 168. An embodiment of the disclosure includes the article according to statement 156, the non-transitory storage medium having stored thereon further instructions that, when executed by the machine, result in:

receiving a command from the policy engine at the controller of the memory device, the command relating to storing a data in the first storage of the memory device or the second storage of the memory device; and
processing the command by the controller of the memory device using the first storage of the memory device or the second storage of the memory device.

Statement 169. An embodiment of the disclosure includes the article according to statement 168, wherein receiving the command from the policy engine at the controller of the memory device includes receiving the command from the policy engine at the controller of the memory device via a command queue.

Statement 170. An embodiment of the disclosure includes the article according to statement 169, wherein receiving the command from the policy engine at the controller of the memory device via the command queue includes receiving the command from the policy engine at the controller of the memory device via a command FIFO queue.

Statement 171. An embodiment of the disclosure includes the article according to statement 168, the non-transitory storage medium having stored thereon further instructions that, when executed by the machine, result in sending a response from the controller of the memory device to the policy engine, the response based at least in part on the command.

Statement 172. An embodiment of the disclosure includes the article according to statement 171, wherein sending the response from the controller of the memory device to the policy engine includes sending the response from the controller of the memory device to the policy engine via a response queue.

Statement 173. An embodiment of the disclosure includes the article according to statement 172, wherein sending the response from the controller of the memory device to the policy engine via the response queue includes sending the response from the controller of the memory device to the policy engine via a response FIFO queue.

Statement 174. An embodiment of the disclosure includes the article according to statement 168, wherein:
 receiving the command from the policy engine at the controller of the memory device includes receiving a prefetch command for a data from the policy engine at the controller of the memory device; and
 processing the command by the controller of the memory device using the first storage of the memory device or the second storage of the memory device includes prefetching the data from the second storage of the memory device into the first storage of the memory device.

Statement 175. An embodiment of the disclosure includes the article according to statement 174, wherein prefetching data from the second storage of the memory device into the first storage of the memory device includes:
 selecting a second data in the first storage of the memory device for eviction; and
 evicting the second data from the first storage of the memory device.

Statement 176. An embodiment of the disclosure includes the article according to statement 175, wherein selecting the second data in the first storage of the memory device for eviction includes selecting the second data in the first storage of the memory device for eviction based at least in part on a temperature of the second data in the first storage of the memory device.

Statement 177. An embodiment of the disclosure includes the article according to statement 175, wherein evicting the second data from the first storage of the memory device includes writing the second data into the second storage of the memory device.

Statement 178. An embodiment of the disclosure includes the article according to statement 168, wherein:
receiving the command from the policy engine at the controller of the memory device includes receiving an evict command for a data from the policy engine at the controller of the memory device; and
processing the command by the controller of the memory device using the first storage of the memory device or the second storage of the memory device includes evicting the data from the first storage of the memory device.

Statement 179. An embodiment of the disclosure includes the article according to statement 178, wherein evicting the data from the first storage of the memory device includes writing the data into the second storage of the memory device.

Statement 180. An embodiment of the disclosure includes the article according to statement 168, wherein:
receiving the command from the policy engine at the controller of the memory device includes receiving a temperature command for a data from the policy engine at the controller of the memory device, the temperature command including a temperature for the data; and
processing the command by the controller of the memory device using the first storage of the memory device or the second storage of the memory device includes updating a metadata for the data in the first storage of the memory device by the controller to store the temperature for the data.

Statement 181. An embodiment of the disclosure includes the article according to statement 168, wherein:
receiving the command from the policy engine at the controller of the memory device includes receiving a status command for a data from the policy engine at the controller of the memory device; and
processing the command by the controller of the memory device using the first storage of the memory device or the second storage of the memory device includes returning a status of the data in the first storage.

Statement 182. An embodiment of the disclosure includes the article according to statement 181, wherein returning the status of the data in the first storage includes returning the status of the data in the first storage based at least in part on a metadata for the data in the first storage of the memory device.

Statement 183. An embodiment of the disclosure includes the article according to statement 181, wherein the status includes a presence of the data in the first storage, an absence of the data in the first storage, an address for the data in the first storage, a size of the data in the first storage, a clean/dirty status for the data in the first storage, a temperature of the data in the first storage, or an access information associated with the data in the first storage.

Consequently, in view of the wide variety of permutations to the embodiments described herein, this detailed description and accompanying material is intended to be illustrative only, and should not be taken as limiting the scope of the disclosure. What is claimed as the disclosure, therefore, is all such modifications as may come within the scope and spirit of the following claims and equivalents thereto.

What is claimed is:

1. A memory device, comprising:
an interface to connect the memory device to a processor;
a first storage for a data;
a second storage for the data;
a controller to process a request received from the processor via the interface using the first storage or the second storage; and
a policy engine to instruct the controller regarding a storing of the data in the first storage or the second storage.

2. The memory device according to claim 1, further comprising:
a command queue for the policy engine to send a command to the controller; and
a response queue for the policy engine to receive a response to the command from the controller.

3. The memory device according to claim 1, further comprising a queue for the controller to inform the policy engine regarding the data stored in the first storage.

4. The memory device according to claim 3, wherein the controller is configured to send information about the request from the processor to the policy engine using the queue.

5. The memory device according to claim 1, wherein the policy engine is configured to instruct the controller regarding the storing of the data in the first storage and the second storage based at least in part on an application using the data.

6. The memory device according to claim 1, further comprising a connector configured to receive a device including the policy engine.

7. The memory device according to claim 1, wherein:
the policy engine includes a second processor and software running on the second processor; and
the memory device is configured to support update of the software running on the second processor.

8. A method, comprising:
sending a command from a policy engine to a controller in a memory device, the command relating to storing a data in a first storage of the memory device or a second storage of the memory device; and
receiving a response at the policy engine from the controller in the memory device, the response based at least in part on the command,
wherein the policy engine is pluggable.

9. The method according to claim 8, wherein sending the command from the policy engine to the controller in the memory device includes:
selecting the data in the second storage of the memory device for prefetch by a policy engine; and
sending a prefetch command for the data in the second storage of the memory device from the prefetch engine to the controller in the memory device.

10. The method according to claim 8, wherein sending the command from the policy engine to the controller in the memory device includes sending an evict command for the data in the first storage of the memory device from a prefetch engine to the controller in the memory device.

11. The method according to claim 8, wherein sending the command from the policy engine to the controller in the memory device includes sending a temperature command for the data from a prefetch engine to the controller in the memory device.

12. The method according to claim 8, wherein sending the command from the policy engine to the controller in the memory device includes sending a status command from the policy engine to the controller in the memory device.

13. The method according to claim 8, further comprising receiving, from the controller in the memory device, information about a request received by the controller in the memory device from a processor.

14. A method, comprising:
   receiving a request from a processor at a controller of a memory device;
   processing the request using a first storage of the memory device or a second storage of the device; and
   sending information about the request to a policy engine that issues instructions regarding a storing of a data in the first storage or the second storage,
   wherein the policy engine is pluggable.

15. The method according to claim 14, wherein the information about the request includes an address for the data in the first storage, a size of the data in the first storage, a clean/dirty status for the data in the first storage, a temperature of the data in the first storage, a last access for the data in the first storage, an access count for the data in the first storage, an access frequency for the data in the first storage, or a host-supplied metadata associated with the data in the first storage.

16. The method according to claim 14, further comprising:
   receiving a command from the policy engine at the controller of the memory device, the command relating to storing a data in the first storage of the memory device or the second storage of the memory device; and
   processing the command by the controller of the memory device using the first storage of the memory device or the second storage of the memory device.

17. The method according to claim 16, wherein:
   receiving the command from the policy engine at the controller of the memory device includes receiving a prefetch command for a data from the policy engine at the controller of the memory device; and
   processing the command by the controller of the memory device using the first storage of the memory device or the second storage of the memory device includes prefetching the data from the second storage of the memory device into the first storage of the memory device.

18. The method according to claim 16, wherein:
   receiving the command from the policy engine at the controller of the memory device includes receiving an evict command for a data from the policy engine at the controller of the memory device; and
   processing the command by the controller of the memory device using the first storage of the memory device or the second storage of the memory device includes evicting the data from the first storage of the memory device.

19. The method according to claim 16, wherein:
   receiving the command from the policy engine at the controller of the memory device includes receiving a temperature command for a data from the policy engine at the controller of the memory device, the temperature command including a temperature for the data; and
   processing the command by the controller of the memory device using the first storage of the memory device or the second storage of the memory device includes updating a metadata for the data in the first storage of the memory device by the controller to store the temperature for the data.

20. The method according to claim 16, wherein:
   receiving the command from the policy engine at the controller of the memory device includes receiving a status command for a data from the policy engine at the controller of the memory device; and
   processing the command by the controller of the memory device using the first storage of the memory device or the second storage of the memory device includes returning a status of the data in the first storage.

* * * * *